(12) United States Patent
Hill et al.

(10) Patent No.: US 12,228,931 B2
(45) Date of Patent: Feb. 18, 2025

(54) SYSTEMS AND METHODS FOR MANAGING POSITIONS OF WATERCRAFTS

(71) Applicant: Navico, Inc., Tulsa, OK (US)

(72) Inventors: Christopher Jason Hill, Auckland (NZ); Mark Harnett, Auckland (NZ); Alex David Salisbury, Auckland (NZ)

(73) Assignee: Navico, Inc., Tulsa, OK (US)

( * ) Notice: Subject to any disclaimer, the term of this patent is extended or adjusted under 35 U.S.C. 154(b) by 137 days.

(21) Appl. No.: 18/321,231

(22) Filed: May 22, 2023

(65) Prior Publication Data

US 2024/0393786 A1    Nov. 28, 2024

(51) Int. Cl.
*B63B 79/40* (2020.01)
*B63B 79/15* (2020.01)
*G05D 1/00* (2006.01)

(52) U.S. Cl.
CPC ........... *G05D 1/0206* (2013.01); *B63B 79/15* (2020.01); *B63B 79/40* (2020.01); *B63B 2213/02* (2013.01)

(58) Field of Classification Search
CPC ...... G05D 1/0206; B63B 79/15; B63B 79/40; B63B 2213/02
See application file for complete search history.

(56) References Cited

U.S. PATENT DOCUMENTS

| | | | |
|---|---|---|---|
| 10,037,701 | B2 | 7/2018 | Harnett |
| 10,725,469 | B2 | 7/2020 | Harnett et al. |
| 11,578,817 | B2 * | 2/2023 | Pigliapoco ............... F16L 1/20 |
| 12,065,908 | B2 * | 8/2024 | Nickerson ............... E21B 17/01 |
| 2020/0050893 | A1 * | 2/2020 | Suresh ..................... G06T 11/40 |
| 2021/0166568 | A1 * | 6/2021 | Kersulec ................. B63B 43/18 |
| 2021/0206460 | A1 * | 7/2021 | Hawker .................... G05D 1/43 |
| 2021/0261226 | A1 * | 8/2021 | Johnson .................. B63B 79/15 |
| 2021/0269128 | A1 * | 9/2021 | Rivers ..................... B63B 49/00 |
| 2021/0291948 | A1 * | 9/2021 | Yamamoto ............. B63H 20/10 |

OTHER PUBLICATIONS

Maslov et al., Safe Maneuvering Near Offshore Installations: A New Algorithmic Tool, 2022, IEEE, p. 895-915 (Year: 2022).*
Theunissen, Design and evaluation of operator support functions for the CShield platform, 2012, IEEE, p. 1-12 (Year: 2012).*
Benjamin et al., COLREGS-based navigation of autonomous marine vehicles, 2004, IEEE, p. 32-39 (Year: 2004).*
Dhariwal et al., Experiments in robotic boat localization, 2007, IEEE, p. 17002-171708 (Year: 2007).*

* cited by examiner

*Primary Examiner* — McDieunel Marc
(74) *Attorney, Agent, or Firm* — Nelson Mullins Riley & Scarborough LLP

(57) ABSTRACT

Example systems and methods are provided herein for managing a position of a first watercraft relative to a second watercraft during a desired maneuver. Such systems include a memory and a processor, and the processor is configured to determine a desired relative positioning of the first watercraft to the second watercraft, determine a first position of the first watercraft, determine a first position of the second watercraft, and then determine a desired second position of the second watercraft such that the first watercraft and the second watercraft comply with the desired relative positioning when the second watercraft is in the desired second position. The processor is also configured to determine instructions to cause the second watercraft to move to the desired second position and then to cause the second watercraft to move to the desired second position.

20 Claims, 14 Drawing Sheets

SYSTEMS AND METHODS FOR MANAGING POSITIONS OF WATERCRAFTS

FIELD OF THE INVENTION

Example embodiments of the present invention generally relate to watercrafts and, more particularly to, systems and methods for managing positions of watercrafts based on a desired maneuver.

BACKGROUND

Watercraft often contain autopilot navigation systems that are configured to help a user navigate a waterway while the user completes other tasks. Such autopilot navigation systems are useful in controlling the watercraft through known waterways and/or navigating to a pre-selected destination. While such autopilot navigation systems are useful in helping a user navigate a waterway, however, users sometimes need to operate a watercraft according to one or more other watercrafts. In such situations, users often decide to disengage the autopilot navigation system and manually operate the watercraft relative to other watercraft. It would be desirable to provide for improvements in such situations.

BRIEF SUMMARY

It can be difficult for a user to maintain relative positioning of their watercraft to others, such as due to environmental or other conditions, length of time of a maneuver, or otherwise. Accordingly, some example embodiments of the present invention include systems and methods for managing positions of watercrafts based on a desired maneuver. As noted above, many watercrafts have autopilot navigation systems that help navigate the watercraft through a waterway and/or to a pre-selected destination. However, a user may wish to control a position of the watercraft based on a desired maneuver involving a second watercraft. For example, it may be desirable to cause a first watercraft to maintain a certain configuration with a second watercraft as the second watercraft navigates through a waterway. This may be useful, e.g., so that a single user located in either watercraft or elsewhere (or no user at all) is able to maintain both the first watercraft and the second watercraft in positioning consistent with a desired maneuver. As noted above, such example embodiments may be beneficial in maintaining accurate relative positioning, which can be useful, such as for performing difficult maneuvers (e.g., for notice captains), for performing maneuvers that last an extended period of time (including, for example, overnight), for performing maneuvers in inconsistent environmental or other conditions (e.g., choppy waves, etc.). Additional benefits are also contemplated and will become apparent to one of ordinary skill in the art in view of this disclosure.

Some example systems include a processor and a memory, and the processor may be configured to accept user input from a user indicating that the user would like to implement a desired maneuver that, e.g., incorporates a first watercraft and a second watercraft. The user input received may include a desired relative positioning of the first watercraft to the second watercraft. For example, in some embodiments, the desired relative positioning may be for refueling purposes, for searching a desired volume of water, or for any other purpose. The processor may then determine a first position of the first watercraft and a first position of the second watercraft. The processor may then determine a desired second position of at least one of the first watercraft or the second watercraft such that the first watercraft and the second watercraft comply with the desired relative positioning when the watercraft(s) are in the desired second position(s). The processor may then determine, based on the desired second position(s) of the watercraft(s), instructions to cause the watercraft(s) to move to the desired second position(s). The processor may then cause the watercraft(s) to move to the desired second position(s) by, e.g., sending the instructions to the required components, such as the motor(s) of the watercraft(s), etc.

In an example embodiment, a system is provided for managing a position of a first watercraft relative to a second watercraft during a desired maneuver. The system includes a processor and a memory including computer executable instructions. The computer executable instructions are configured to, when executed by the processor, cause the processor to determine a desired maneuver including a desired relative positioning of the first watercraft to the second watercraft, determine a first position of the first watercraft, determine a first position of the second watercraft, determine, based on the desired maneuver, a desired second position of the second watercraft such that the first watercraft and the second watercraft comply with the desired relative positioning when the second watercraft is in the desired second position, determine, based on the desired second position of the second watercraft, instructions to cause the second watercraft to move to the desired second position, and cause the second watercraft to move to the desired second position such that the first watercraft and the second watercraft comply with the desired relative positioning of the desired maneuver.

In some embodiments, the processor may be located on the first watercraft.

In some embodiments, the processor may be located on the second watercraft.

In some embodiments, the processor may be located at a remote location.

In some embodiments, determining the first position of the second watercraft or determining the desired second position of the second watercraft may include receiving marine data from one or more marine devices on the first watercraft and determining the desired second position of the second watercraft based on the received marine data.

In some embodiments, the marine data may include at least one of LIDAR data, data from vision systems, radar data, AIS data, sonar data, weather data, position sensor data, autopilot navigation system data, GPS data, predetermined threshold data, or vessel data.

In some embodiments, determining the instructions may include receiving marine data and determining the instructions based on the received marine data.

In some embodiments, the marine data may include at least one of LIDAR data, data from vision systems, radar data, AIS data, sonar data, weather data, position sensor data, autopilot navigation system data, GPS data, predetermined threshold data, or vessel data.

In some embodiments, causing the second watercraft to move to the desired second position may include causing at least one of a speed or a direction of the second watercraft to be altered such that the first watercraft and the second watercraft comply with the desired relative positioning of the desired maneuver.

In some embodiments, causing the second watercraft to move to the desired second position may include sending a signal to the second watercraft that instructs the second watercraft to alter at least one of a speed or a direction of the second watercraft such that the first watercraft and the second watercraft comply with the desired relative positioning of the desired maneuver.

In some embodiments, the processor may be configured to receive user input indicating the desired maneuver.

In some embodiments, the user input may be received from a marine electronic device.

In some embodiments, the desired maneuver may correspond to causing the first watercraft and the second watercraft to travel over a desired search area of water.

In some embodiments, the processor may be integrated into an autopilot navigation system that is associated with at least one of the first watercraft or the second watercraft.

In some embodiments, the desired second position of the second watercraft and the instructions may be configured to cause the first watercraft to move such that the first watercraft follows the second watercraft in a following position that is offset from a path of the second watercraft.

In some embodiments, the desired second position of the second watercraft and the instructions may be configured to cause the first watercraft to move such that the first watercraft follows the second watercraft in a way that dynamically changes in response to periodically received marine data.

In another example embodiment, a method is provided for managing a position of a first watercraft relative to a second watercraft during a desired maneuver. The method includes determining a desired maneuver including a desired relative positioning of the first watercraft to the second watercraft, determining a first position of the first watercraft, determining a first position of the second watercraft, determining, based on the desired maneuver, a desired second position of the second watercraft such that the first watercraft and the second watercraft comply with the desired relative positioning when the second watercraft is in the desired second position, determining, based on the desired second position of the second watercraft, instructions to cause the second watercraft to move to the desired second position, and causing the second watercraft to move to the desired second position such that the first watercraft and the second watercraft comply with the desired relative positioning of the desired maneuver.

In some embodiments, causing the second watercraft to move to the desired second position may include causing at least one of a speed or a direction of the second watercraft to be altered such that the first watercraft and the second watercraft comply with the desired relative positioning of the desired maneuver.

In some embodiments, causing the second watercraft to move to the desired second position may include sending a signal to the second watercraft that instructs the second watercraft to alter at least one of a speed or a direction of the second watercraft such that the first watercraft and the second watercraft comply with the desired relative positioning of the desired maneuver.

In another example embodiment, a non-transitory computer readable medium is provided. The non-transitory computer readable medium has stored thereon computer instructions that, when executed by a processor, cause the processor to determine a desired maneuver including a desired relative positioning of a first watercraft to a second watercraft, determine a first position of the first watercraft, determine a first position of the second watercraft, determine, based on the desired maneuver, a desired second position of the second watercraft such that the first watercraft and the second watercraft comply with the desired relative positioning when the second watercraft is in the desired second position, determine, based on the desired second position of the second watercraft, instructions to cause the second watercraft to move to the desired second position, and cause the second watercraft to move to the desired second position such that the first watercraft and the second watercraft comply with the desired relative positioning of the desired maneuver.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
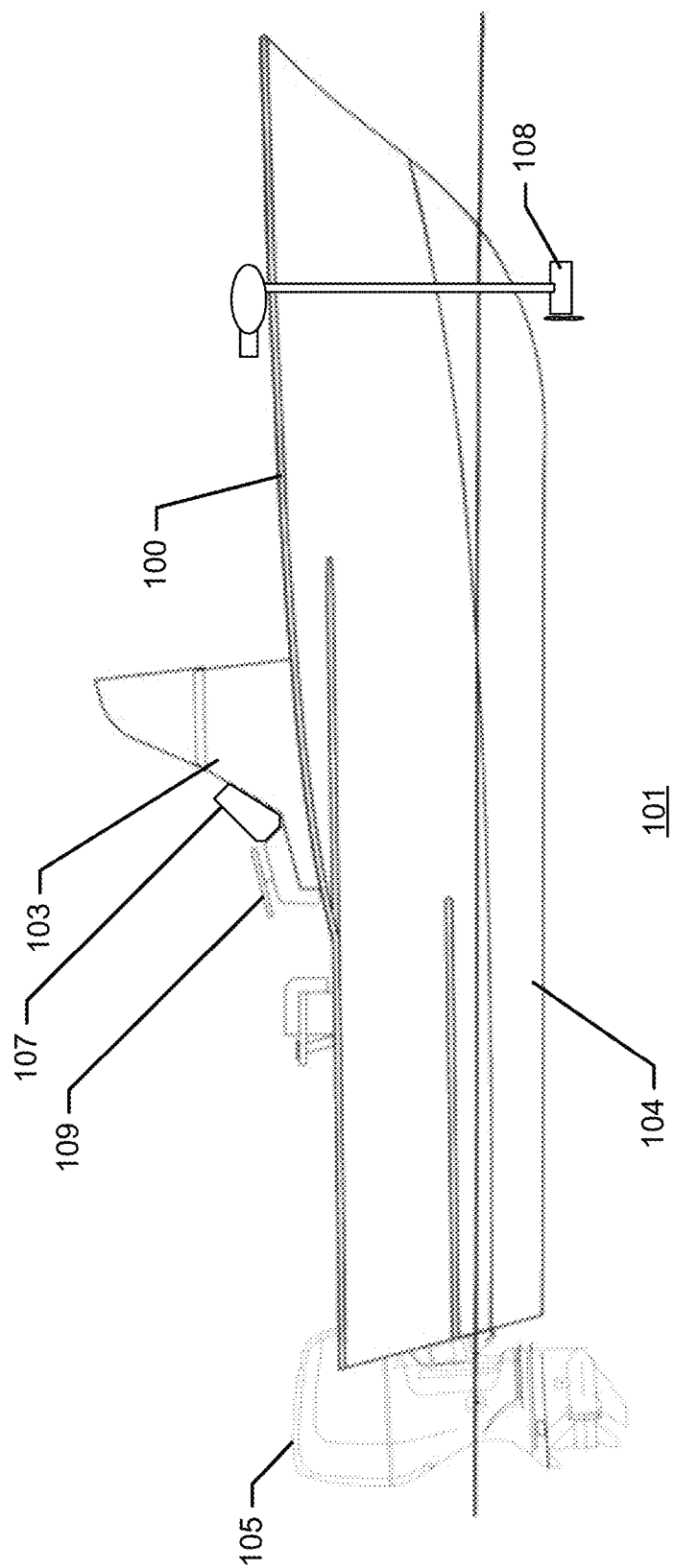
FIG. 1 shows an example watercraft, in accordance with some embodiments described herein.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

FIG. 1 shows a watercraft 100 (e.g., a vessel) configured to traverse a marine environment, e.g., body of water 101. The watercraft 100 may be a surface watercraft, a submersible watercraft, or any other implementation known to those skilled in the art. The watercraft 100 may include one or more marine electronic devices 107, such as may be utilized by a user to interact with, view, or otherwise control various aspects of the watercraft and its various marine systems described herein. In the illustrated embodiment, the marine electronic device 107 is positioned proximate the helm (e.g., steering wheel) of the watercraft 100 on a console 103—although other places on the watercraft 100 are contemplated. Likewise, additionally or alternatively, a user's mobile device may include functionality of a marine electronic device.

Depending on the configuration, the watercraft 100 may include a main propulsion motor 105, such as an outboard or inboard motor. Additionally, the watercraft 100 may include a trolling motor 108 configured to propel the watercraft 100 or maintain a position. The motor 105 and/or the trolling motor 108 may be steerable using steering wheel 109, or in some embodiments, the watercraft 100 may have an autopilot navigation assembly that is operable to steer the motor 105 and/or the trolling motor 108, when engaged. The autopilot navigation assembly may be connected to a processor and/or be within a marine electronic device 107, or it may be located anywhere else on the watercraft 100. Alternatively, it may be located remotely, or in other embodiments, the watercraft 100 may not have an autopilot navigation assembly at all.

Figure 8:
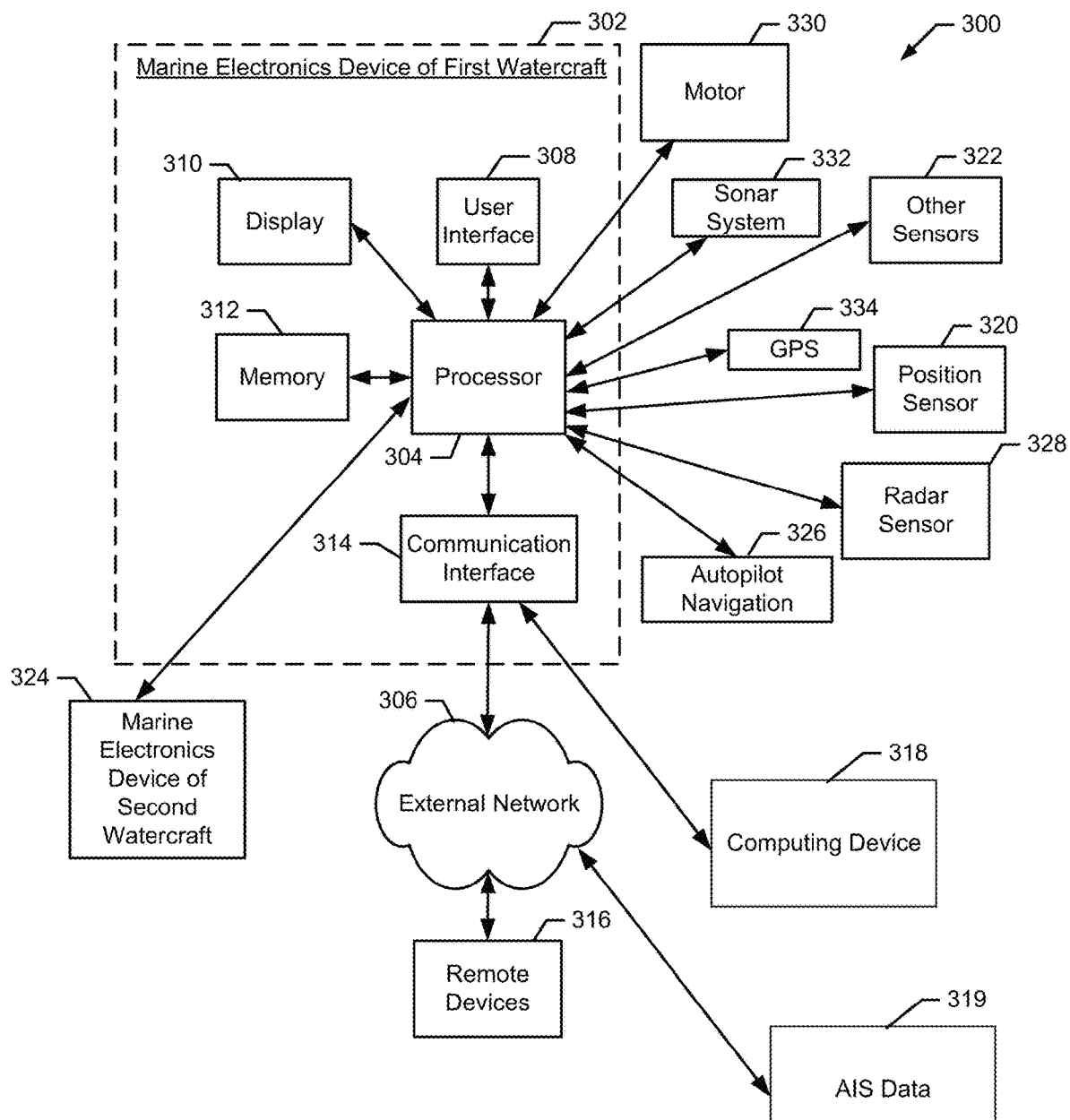
FIG. 8 is a block diagram of an example system capable of managing a first watercraft and a second watercraft based on a desired maneuver, the processor being located within a marine electronics device of the first watercraft, in accordance with some embodiments described herein.
Figure 9:
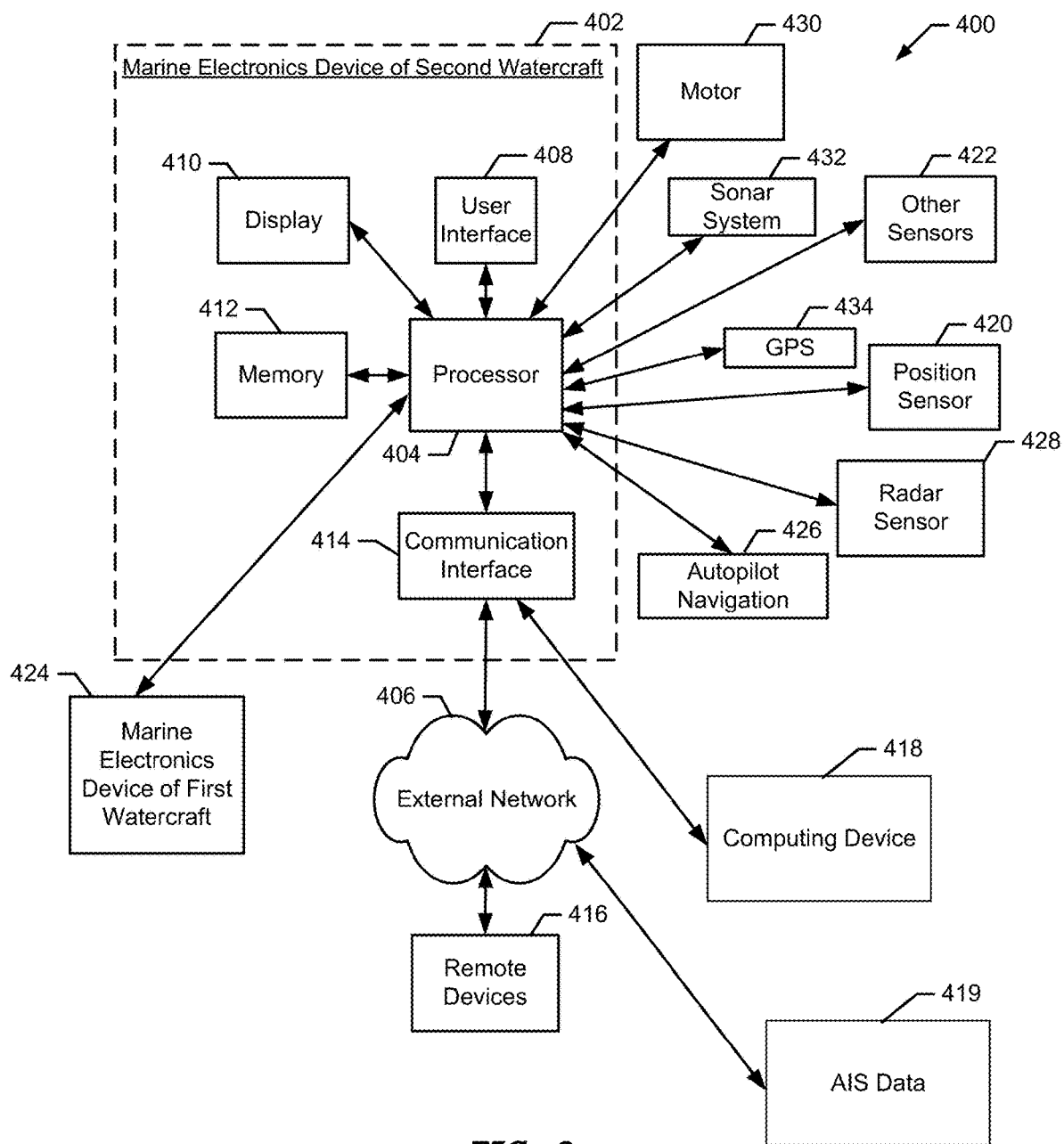
FIG. 9 is a block diagram of an example system capable of managing a first watercraft and a second watercraft based on a desired maneuver, the processor being located within a marine electronics device of the second watercraft, in accordance with some embodiments described herein.
Figure 10:
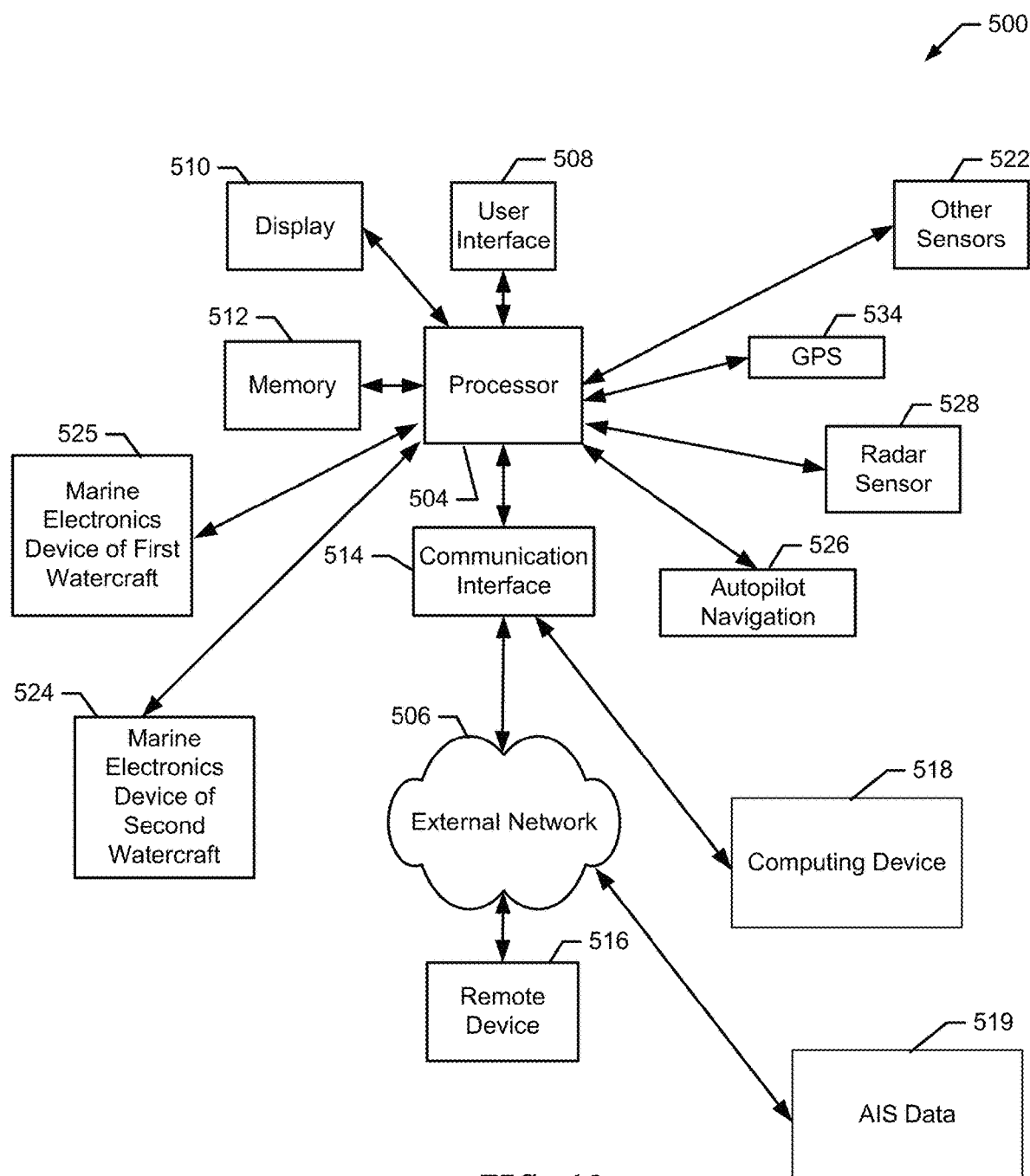
FIG. 10 is a block diagram of an example system capable of managing watercrafts based on a desired maneuver, the processor being located remotely, in accordance with some embodiments described herein.

Such as to be described further herein, such as with reference to FIGS. 8-10, various systems described herein enable a processor to manage a position of one or more watercrafts with respect to one or more other watercrafts. Such systems generally include a processor and a memory, the memory including instructions configured to, when executed by the processor, cause the processor to execute a number of steps. For example, a processor may be configured to determine a desired maneuver that includes a desired relative positioning of a first watercraft to a second watercraft. Then, the processor may be configured to determine first positions of the first watercraft and the second watercraft. Using the determined first positions and the determined desired maneuver, the processor may then be configured to determine a desired second position of the second watercraft that corresponds to the first watercraft and the second watercraft complying with the desired relative positioning. The processor may also be configured to determine instructions to cause the second watercraft to move to the desired second position and then cause the second watercraft to move to the desired second position. Such steps, when executed by the processor, may cause the first watercraft and the second watercraft to comply with the desired relative positioning of the desired maneuver.

Figure 2A:
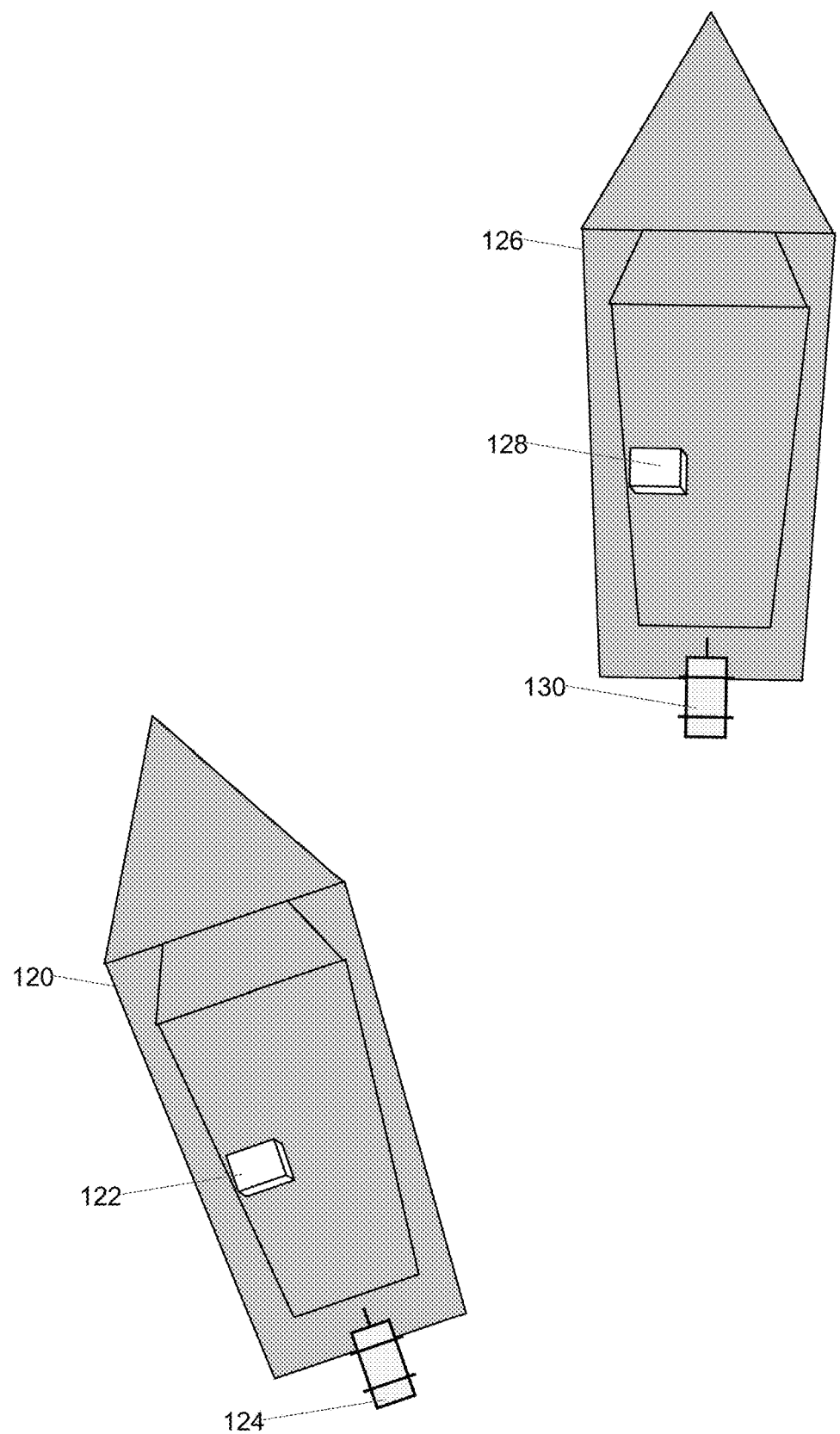
FIG. 2A shows a first watercraft and a second watercraft, the first watercraft being in a first position, in accordance with some embodiments discussed herein.
Figure 2B:
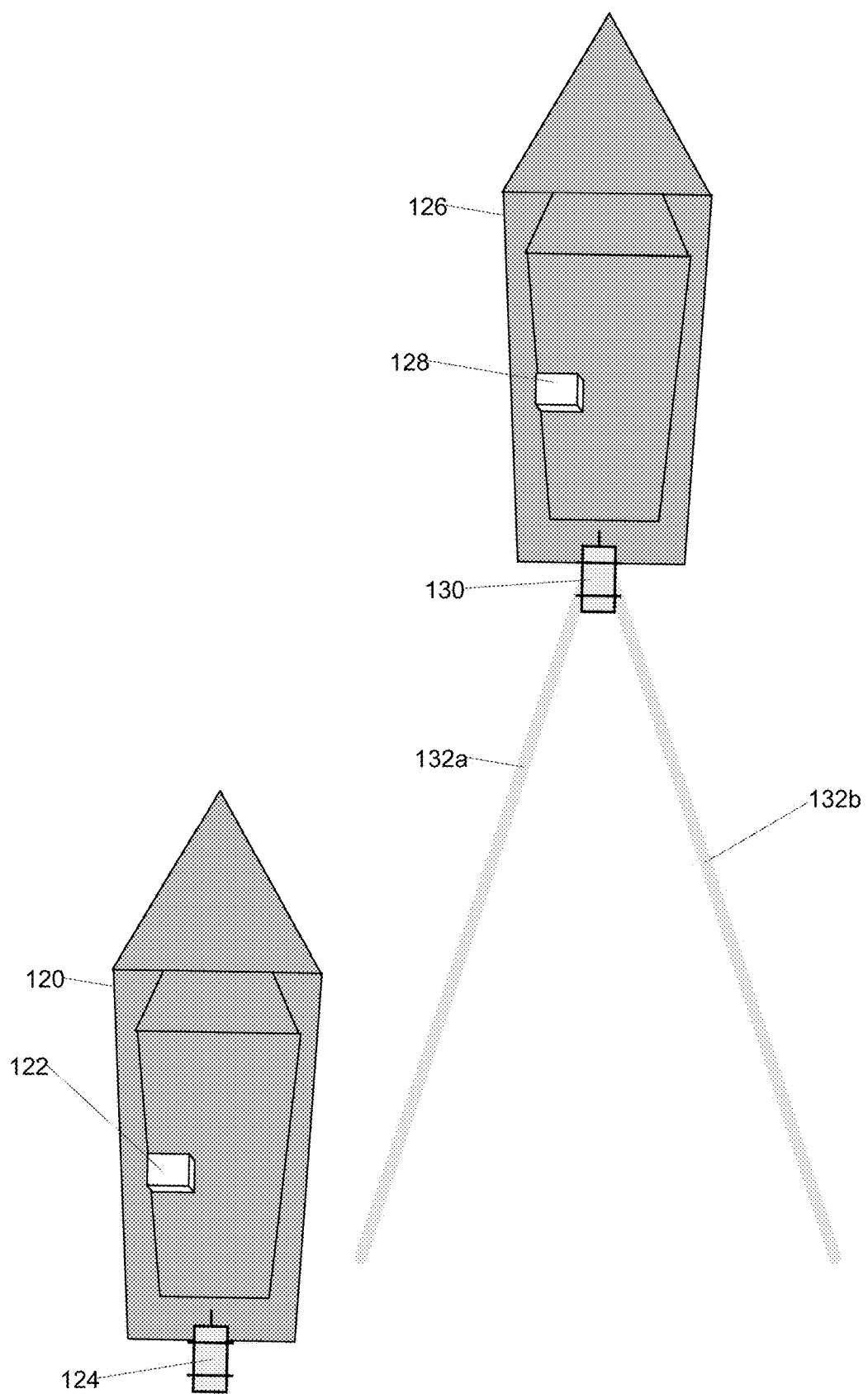
FIG. 2B shows the first watercraft and the second watercraft of FIG. 2A, the second watercraft being in a desired second position based on a desired maneuver, in accordance with some embodiments discussed herein.

FIGS. 2A-2B show a first watercraft 120 and a second watercraft 126. The first watercraft 120 has a console 122 and a motor 124, and the second watercraft 126 has a console 128 and a motor 130. In some embodiments, the console 122 on the first watercraft 120 may have a first marine electronics device, and the console 128 on the second watercraft 126 may have a second marine electronics device. In FIG. 2A, the first watercraft 120 is located at a first position, and the second watercraft 126 is also located at a first position. For example, in the embodiment shown, the first watercraft 120 and the second watercraft 126 are oriented randomly with respect to each other in their respective first positions. In FIG. 2B, the first watercraft 120 has moved to a second desired position. That is, in FIG. 2B, the first watercraft 120 is oriented with respect to the second watercraft 126 such that a desired relative positioning corresponding to a desired maneuver is achieved. In the embodiment shown in FIG. 2B, the second watercraft 126 has a wake with a first side 132a and a second side 132b, and the first watercraft 120 is being maintained in a desired second position that is outside of the first side 132a of the wake of the second watercraft 126.

As shown by the change of the first watercraft 120 from the first position in FIG. 2A to the second desired position in FIG. 2B, the systems disclosed herein are capable of determining (e.g., detecting) initial positions of watercrafts, determining a desired maneuver, and then determining a desired second position for a watercraft and instructions to cause the second watercraft to move to the desired position. In some embodiments, the instructions determined by the processor may include instructions to cause at least one of a speed or a direction of the first watercraft 120 to be altered such that the first watercraft 120 and the second watercraft 126 comply with the desired maneuver. In other embodiments, the instructions determined by the processor may include instructions to send a signal to the first watercraft 120 that instructs the first watercraft 120 to alter at least one of a speed or a direction of the second watercraft such that the first watercraft 120 and the second watercraft 126 comply with the desired relative positioning of the desired maneuver. Further, in some embodiments, the processor making the system determinations may be located on one of the watercrafts involved (e.g., within a marine electronics device on the first watercraft 120 or on the second watercraft 126). Or in some other embodiments, as will be described in more detail with respect to FIG. 7, the processor may be located at a remote location. Further, the processor may or may not be integrated into an autopilot navigation system that is associated with at least one of the first watercraft 120 or the second watercraft 126.

In some embodiments, the processor may determine the first position of the first watercraft 120 (e.g., the position of the first watercraft 120 shown in FIG. 2A), the first position of the second watercraft 126 (e.g., the position of the second watercraft 126 shown in FIG. 2A), or the desired second position of the second watercraft 126 (e.g., the position of the second watercraft 126 shown in FIG. 2B) by receiving marine data from one or more marine devices on the first watercraft 120 and/or the second watercraft 126. For example, the console 122 (e.g., a marine electronic device) on the first watercraft 120 may comprise one or more marine devices that transmit marine data to the processor, and the console 128 (e.g., a marine electronic device) on the second watercraft 126 may comprise one or more marine devices that transmit marine data to the processor. The processor may or may not be integrated into a marine electronic device of the first watercraft 120 or the second watercraft 126 (e.g., the processor could be located at a remote location, such as described herein with respect to FIG. 7). The marine data used to make such determinations may include, e.g., at least one of LIDAR data, data from vision systems, radar data, AIS data, sonar data, weather data, position sensor data (e.g., location, heading, and/or compass information), autopilot navigation system data, GPS data, predetermined threshold data, or vessel data.

In some embodiments, for example, the processor may receive marine data such as position sensor data from a marine electronic device on the second watercraft 126 to help determine the first position of the second watercraft 126. For example, the position sensor data may include, in some embodiments, location, heading, and/or compass information. Additionally or alternatively, the processor may receive marine data in the form of AIS or weather data from a remotely-located source such as a control tower and/or an internet network to determine the desired second position of the first watercraft 120. Further, the processor may receive information from an autopilot system and/or GPS that may or may not be located on one of the first watercraft 120 or the second watercraft 126. The processor may also receive and/or communicate with any other component, other than those listed, to receive such marine data. After receiving such marine data from one or more sources, the processor may then determine the desired second position of the first watercraft 120 (e.g., the position of the first watercraft 120 shown in FIG. 2B) based on the received marine data. For example, in the embodiment shown in FIGS. 2A-2B, the instructions are configured to cause the first watercraft 120 to move such that the first watercraft 120 follows the second watercraft 126 in a following position that is offset from a path of the second watercraft 126.

Figure 3A:
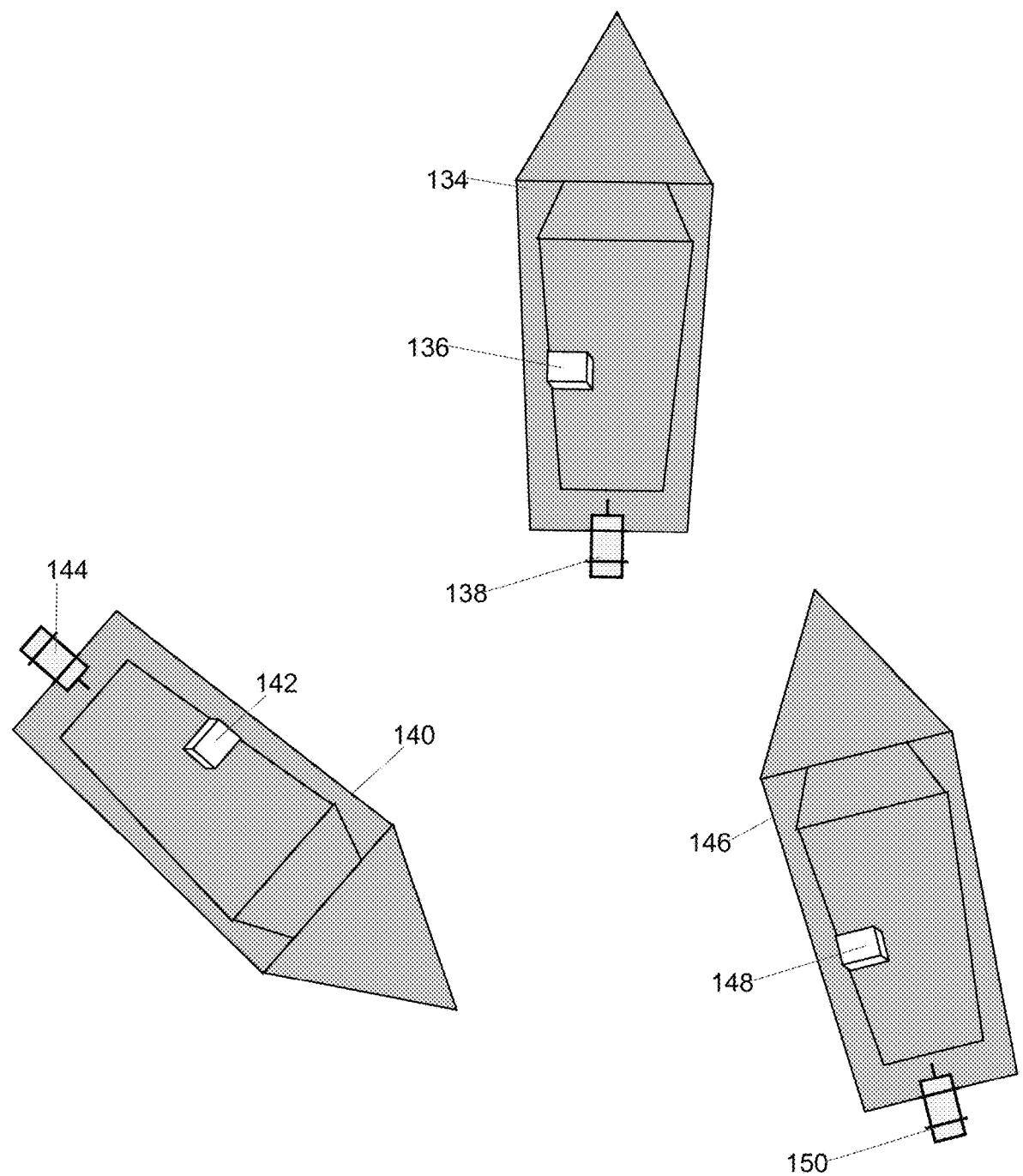
FIG. 3A shows a first watercraft, a second watercraft, and a third watercraft, the first watercraft and the second watercraft being in first positions, in accordance with some embodiments discussed herein.
Figure 3B:
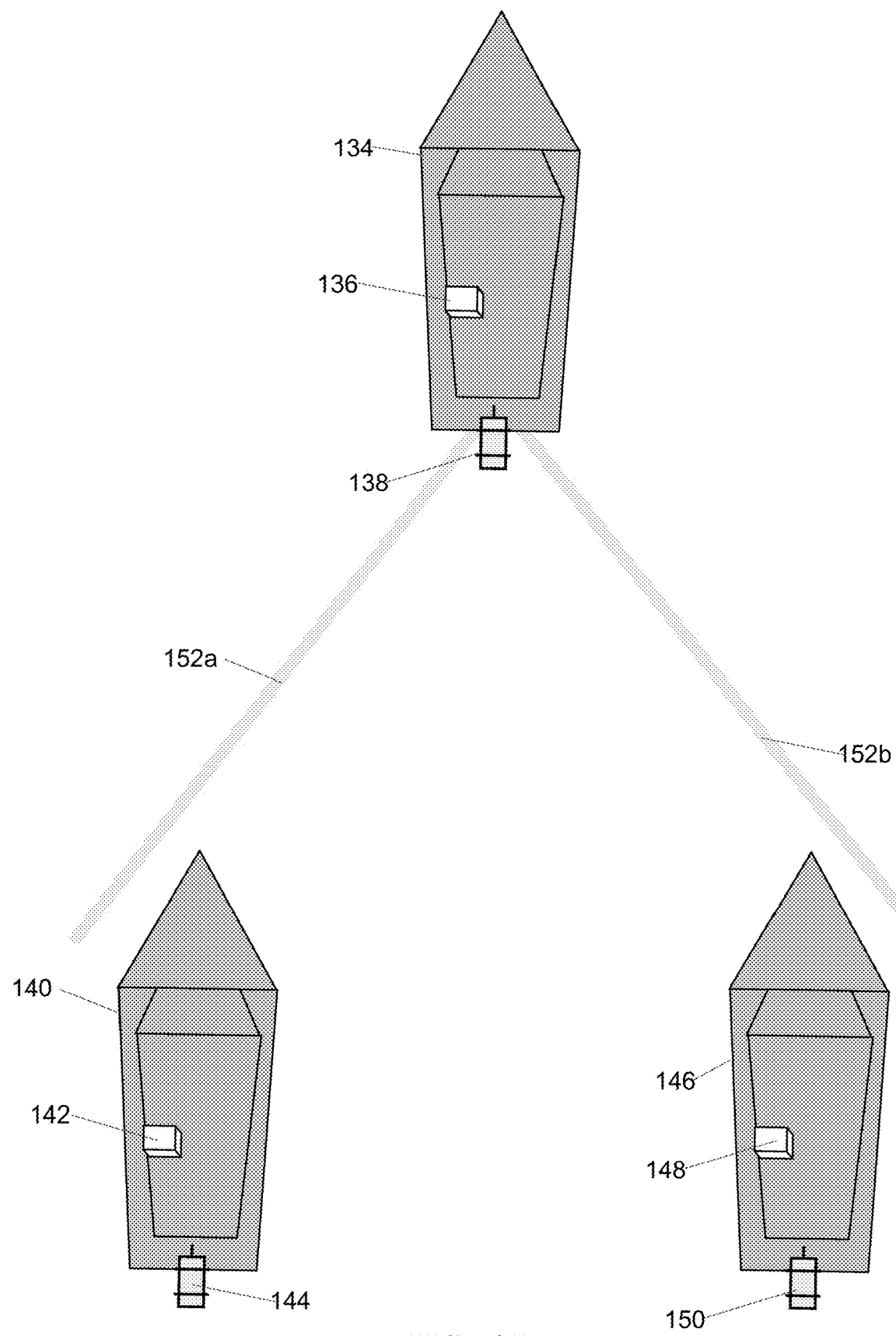
FIG. 3B shows the first watercraft, the second watercraft, and the third watercraft of FIG. 3A, the first watercraft and the second watercraft being in second desired positions based on a desired maneuver that keeps the first and second watercrafts offset from the third watercraft, in accordance with some embodiments discussed herein.
Figure 3C:
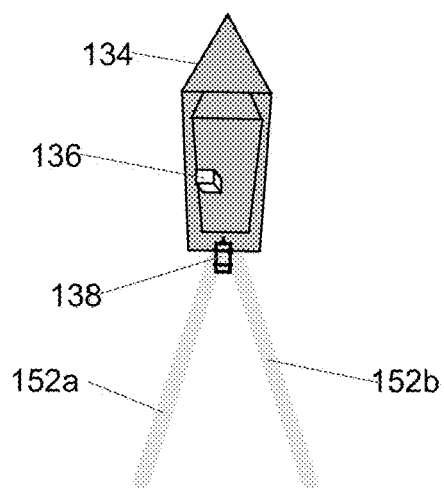
FIG. 3C shows the first watercraft, the second watercraft, and the third watercraft of FIG. 3A, the first watercraft and the second watercraft being in second desired positions based on a desired maneuver that keeps the first and second watercrafts in line with the third watercraft, in accordance with some embodiments discussed herein.
Figure 3C:
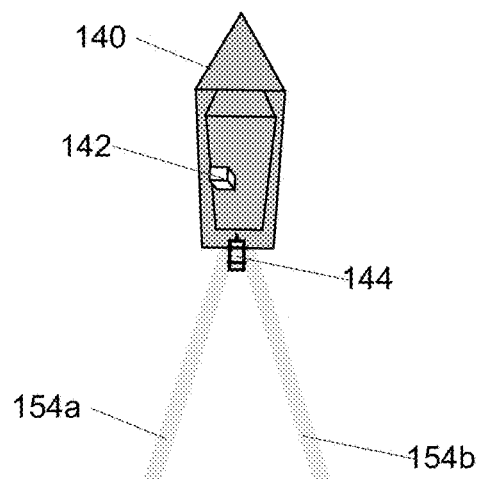
Figure 3C:
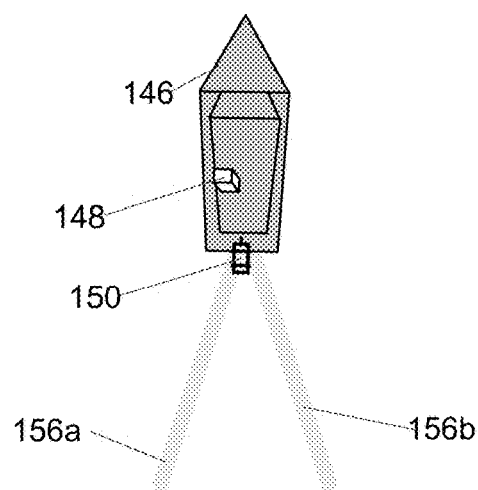

FIGS. 3A-3C show a first watercraft 134, a second watercraft 140, and a third watercraft 146. The first watercraft 134 has a console 136 and a motor 138, the second watercraft 140 has a console 142 and a motor 144, and the third watercraft 146 has a console 148 and a motor 150. In some embodiments, the console 136 on the first watercraft 134 may have a first marine electronics device, the console 142 on the second watercraft 140 may have a second marine electronics device, and the console 148 on the third watercraft 146 may have a third marine electronics device. In FIG. 3A, the first watercraft 134, the second watercraft 140, and the third watercraft 146 are oriented, e.g., randomly with respect to each other. In FIG. 3B, the first watercraft 134 is oriented with respect to the second watercraft 140 and the third watercraft 146 such that a desired relative positioning corresponding to a desired maneuver is achieved. For example, in the embodiment shown in FIG. 3B, the first watercraft 134 has a wake with a first side 152*a* and a second side 152*b*, and the second watercraft 140 and the third watercraft 146 are being maintained in desired second positions that are behind and between the first side 152*a* and the second side 152*b* of the wake of the first watercraft 134. In such a convoy orientation, the second watercraft 140 and third watercraft 146 may be protected by the wake of the first watercraft 134—thereby reducing wave disturbances on the following watercraft to, for example, increase the desirable travel experience and/or reduce engine usage of the following watercraft. In some embodiments, the expected wake position may be determined (e.g., based on expected speed, watercraft shape/size, water conditions, etc.) and used to determine where to position the following watercraft accordingly.

The desired maneuver may be determined in a number of different ways. For example, a marine electronic device on the first watercraft 134, the second watercraft 140, or the third watercraft 146 may be configured to receive user input indicative of a desired maneuver, and the marine electronics device may be configured to then communicate information related to the desired maneuver to a processor. The processor may or may not be integrated into the marine electronics device that received the user input. For example, the processor may be integrated into a marine electronics device of any of the first watercraft 134, the second watercraft 140, or the third watercraft 146, or the processor may alternatively be located at a remote location. In the embodiment shown in FIGS. 3A-3B, the desired maneuver is a V-pattern with the second watercraft 140 and the third watercraft 146 being behind and within the left side 152*a* of the wake of the first watercraft 134 and the right side 152*b* of the wake of the first watercraft 134.

Additionally, in some embodiments, the desired second positions of the second watercraft 140 and the third watercraft 146 and the instructions may be configured to cause the second watercraft 140 and the third watercraft 146 to move such that the second watercraft 140 and the third watercraft 146 follow the first watercraft 134 in a way that dynamically changes in response to periodically received marine data. For example, the processor may be configured to automatically alter the desired second positions accordingly to periodically received weather data such that the watercrafts travel closer together in calm conditions and travel farther apart in more turbulent conditions.

FIG. 3C demonstrates another desired maneuver that is configured to cause the first watercraft 134, the second watercraft 140, and the third watercraft 146 to travel in a straight line with predetermined amount of space between each other. The first watercraft 134 has a wake with a first side 152*a* and a second side 152*b*, the second watercraft 140 has a wake with a first side 154*a* and a second side 154*b*, and the third watercraft 146 has a wake with a first side 156*a* and a second side 156*b*. The second watercraft 140 and the third watercraft 146 are being maintained in desired second positions that are directly behind the first watercraft 134. For example, the desired maneuver may indicate that the first watercraft 134 and the second watercraft 140 be separated by a distance of 100 feet and that the second watercraft 140 and the third watercraft 146 be separated by a distance of 100 feet. Alternatively, the desired maneuver may indicate that the watercrafts be separated by a distance that is equal to 3 times the length of the first watercraft 134 (although other following distances/positions are contemplated herein). The predetermined distance may be determined in any other way, and the desired maneuver may take on any other shape or form.

Figure 4:
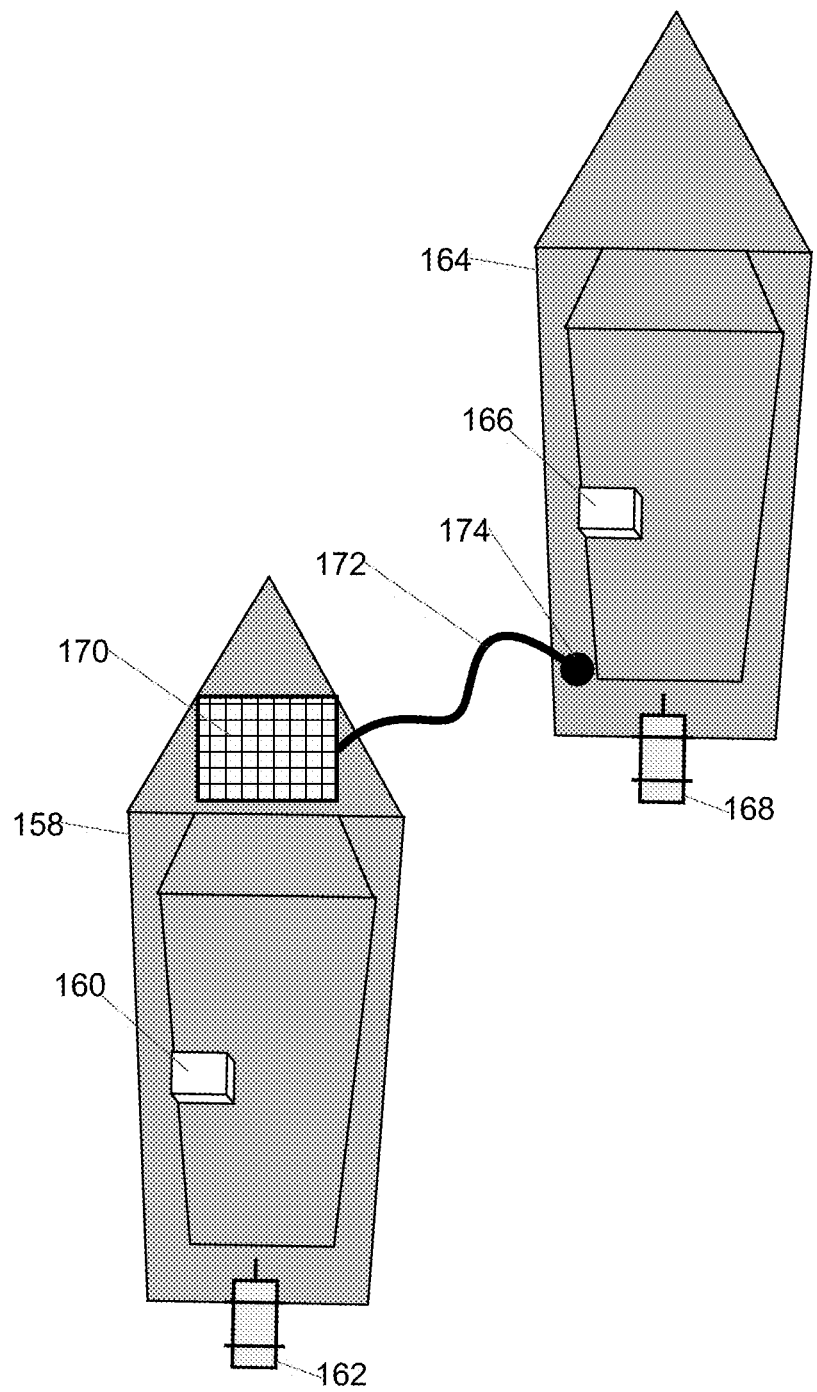
FIG. 4 shows a first watercraft and a second watercraft, the second watercraft being in a desired second position based on a desired maneuver that keeps the first watercraft in a refueling position with respect to the second watercraft, in accordance with some embodiments discussed herein.

FIG. 4 shows a first watercraft 158 and a second watercraft 164 in a desired maneuver for refueling. The first watercraft 158 has a console 160, a motor 162, and a refueling tank 170. The second watercraft 164 has a console 166 and a motor 168. The refueling tank 170 on the first watercraft 158 is connect to a refueling hole 174 on the second watercraft 164 by a hose 172. A processor, which may be located on a marine electronic device on either the first watercraft 158 or the second watercraft 164 (e.g., within the console 160 or the console 166), or at a remote location, may be programmed to send instructions to the first watercraft 158 to cause the first watercraft 158 to maintain a certain position with respect to the second watercraft 164 so that the hose 172 is not pulled or otherwise disengaged from either of the refueling hole 174 or the refueling tank 170. Such a distance determination may be based on many factors, such as water conditions, hose length, position of the tank and/or receiving port, among many others.

Figure 5C:
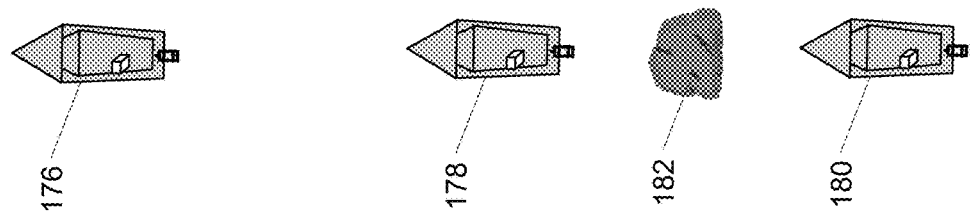
FIG. 5C shows the first watercraft, the second watercraft, and the third watercraft of FIGS. 5A-5B, with the second watercraft returning to the path that follows the desired maneuver, in accordance with some embodiments discussed herein.
Figure 5B:
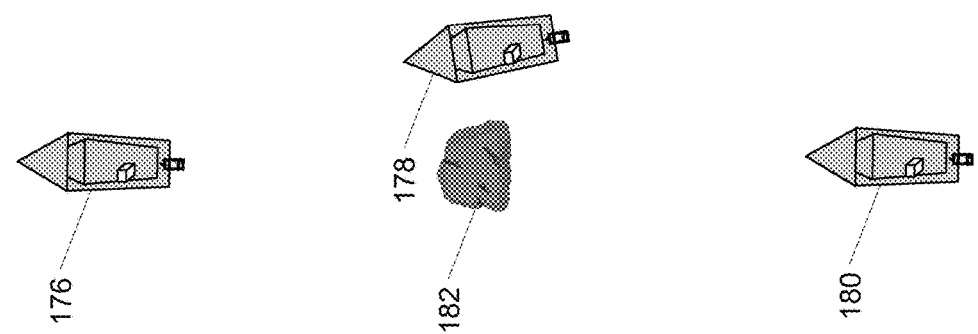
FIG. 5B shows the first watercraft, the second watercraft, and the third watercraft of FIG. 5A, with the second watercraft traveling around the obstacle, in accordance with some embodiments discussed herein.
Figure 5A:
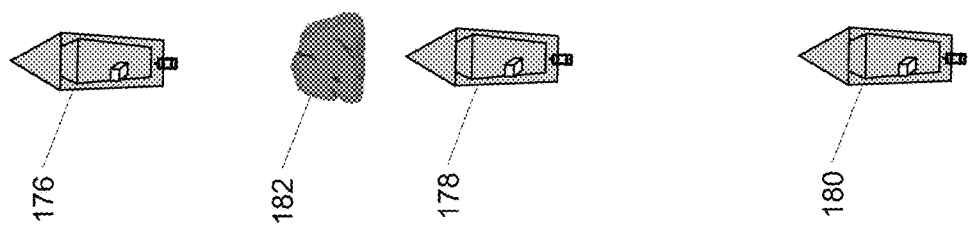
FIG. 5A shows a first watercraft, a second watercraft, and a third watercraft in a desired maneuver, the second watercraft having an obstacle in its path, in accordance with some embodiments discussed herein.

FIGS. 5A-5C show a first watercraft 176, a second watercraft 178, and a third watercraft 180 traveling in a straight pattern at predetermined distances, such as shown and described with respect to FIG. 3C. In FIG. 5A, an obstacle 182 (e.g., a rock) is in the path that the second watercraft 178 would have to take in order to comply with the desired maneuver of staying in a straight line and at a predetermined distance with respect to the first watercraft 176. In some embodiments, systems may be configured to temporarily cause the second watercraft 178 to travel outside of the desired maneuver to avoid the obstacle. For example, as shown in FIG. 5B, the second watercraft 178 travels around the obstacle 182 while the first watercraft 176 and the third watercraft 180 continue to travel in a straight direction (the desired maneuver being moving a straight line at predetermined distances). Then, once the second watercraft 178 has overcome the obstacle 182, as shown in FIG. 5C, the second watercraft 178 returns to a path that is in compliance with the desired maneuver. For example, in the embodiment shown in FIGS. 5A-5C, the second watercraft 178 returns to following directly behind the first watercraft at the predetermined distance.

Figure 6:
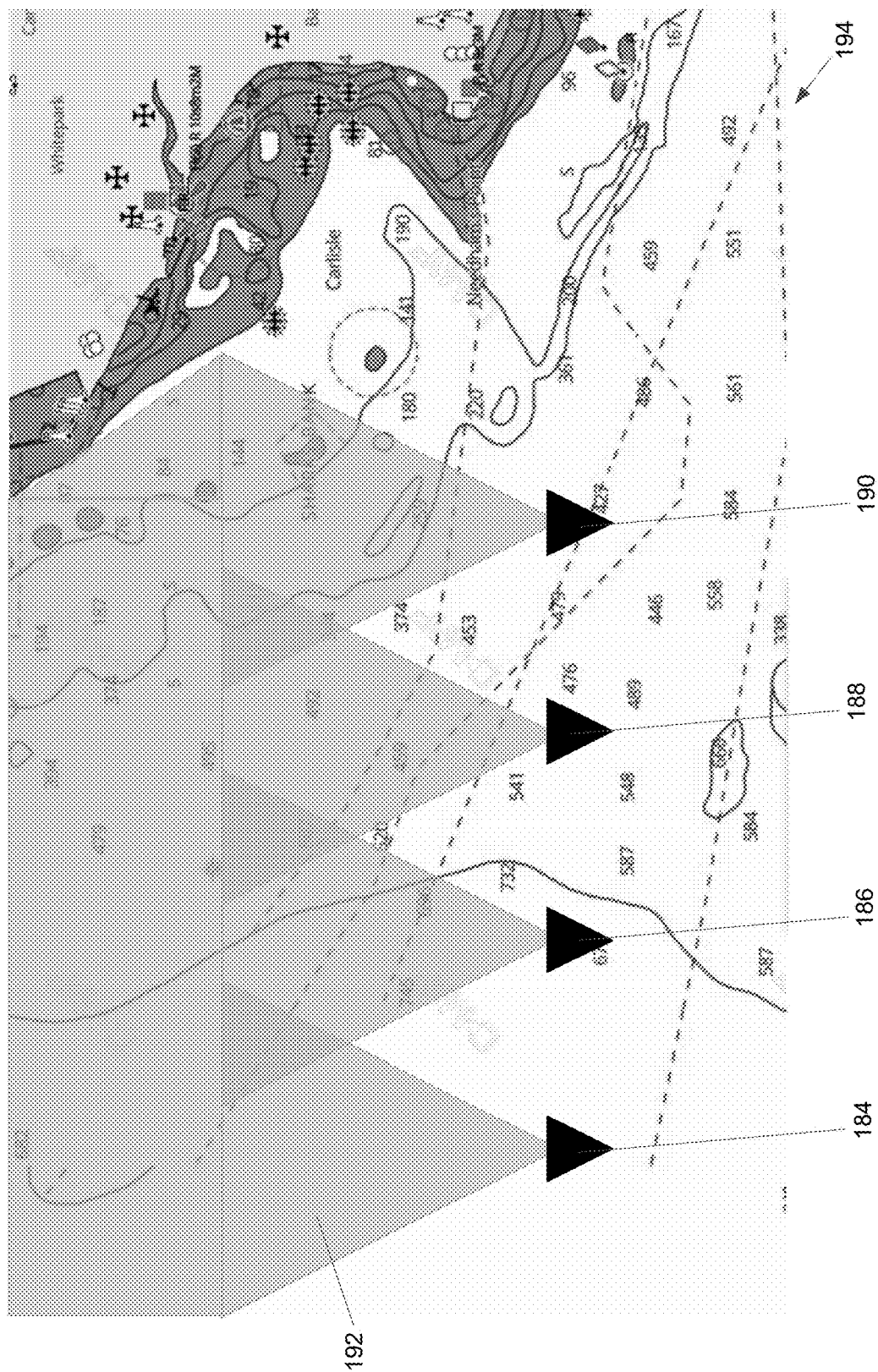
FIG. 6 shows a first watercraft, a second watercraft, a third watercraft, and a fourth watercraft in a desired maneuver, the desired maneuver corresponding to causing the first watercraft, the second watercraft, the third watercraft, and the fourth watercraft to travel over a desired search area of water, in accordance with some embodiments discussed herein.

FIG. 6 shows icons depicting a first watercraft 184, a second watercraft 186, a third watercraft 188, and a fourth watercraft 190 in a desired maneuver that corresponds to causing the first watercraft 184, the second watercraft 186, the third watercraft 188, and the fourth watercraft 190 to travel over a desired search area of water. For example, in applications in which a search party is employed to look for debris or a body in the water, users may need to make sure that a convoy of watercrafts thoroughly cover a certain search area of water in a manner that is efficient so that time is not wasted. In the embodiment shown in FIG. 6, a processor may be located on any of the first watercraft 184, the second watercraft 186, the third watercraft 188, or the fourth watercraft 190, or the processor may be located elsewhere such as at a remote location. As will be described in more detail herein, the processor may be configured to cause the first watercraft 184, the second watercraft 186, the third watercraft 188, and the fourth watercraft 190 to travel in compliance with a desired maneuver such that the desired search area of water 192 is covered. For example, the desired maneuver may be configured such that the desired search area of water 192 includes the volume of water that corresponds to water that was at least once within reasonable visible distance of one of the watercrafts.

Figure 7:
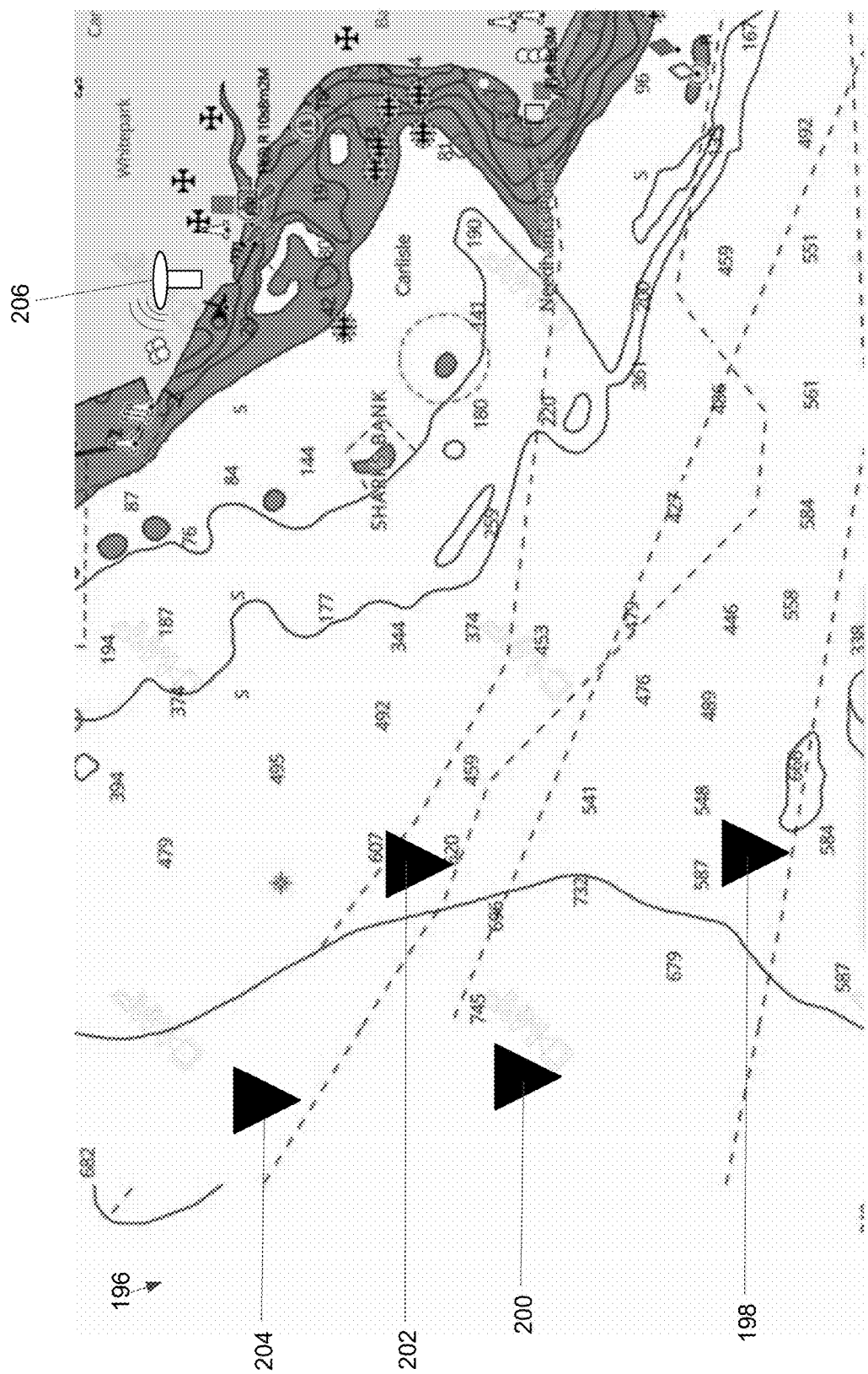
FIG. 7 shows a first watercraft, a second watercraft, a third watercraft, and a fourth watercraft in a desired maneuver, the desired maneuver being determined at a remote location, in accordance with some embodiments discussed herein.

Some waterways have high traffic and are thus controlled by a control tower. FIG. 7 shows a first watercraft 198, a second watercraft 200, a third watercraft 202, and a fourth watercraft 204 in a desired maneuver being determined and facilitated by a processor located at a remotely located control tower 206. For example, the processor located at the control tower 206 may be in communication with marine electronic devices on the first watercraft 198, the second watercraft 200, the third watercraft 202, and the fourth watercraft 204 to determine desired second positions and to cause the first watercraft 198, the second watercraft 200, the third watercraft 202, and the fourth watercraft 204 to move to the determined desired positions such that the desired maneuver is executed. This may be useful, for example, in waterways with high traffic to ensure that convoys or groups of watercrafts are efficiently navigated through various obstacles within the waterway. Alternatively, referring back to the embodiment shown in FIG. 6, it may be easier for a search of a body of water to be conducted if the processor, user interface, and other controls are located at a remote tower.

Notably, in any example embodiments described herein, depending on the configuration of the watercraft, a user may be able to take over control of any of the watercraft manually and/or through navigation systems. In some embodiments, such as depending on the circumstance, the system may be configured to determine to re-engage the relative positioning of the watercraft and cause the watercraft to re-position once the user-initiated maneuver is complete. Alternatively, the relative positioning protocol may be disengaged entirely in favor of user control. In some such circumstances, one or more alerts may be provided on one or more of the watercrafts and/or remotely, such as to a control tower (or other remote device).

In this regard, in some embodiments, one or more alerts may be provided to any watercraft and/or remotely located device, such as a control tower. Such alerts may be based on real-time data affecting the relative positioning protocol, such as obstacles or hazards, other watercraft, weather or other environmental factors, manual overrides, low fuel or other watercraft related events, etc. Such alerts could be provided in any number of ways, such as visually on one or more displays, audibly, or physically (e.g., vibration, etc.).

Example System Architectures

FIG. 8 shows a block diagram of an example system 300 capable for use with several embodiments of the present disclosure. As shown, the system 300 may include a number of different modules or components, each of which may comprise any device or means embodied in either hardware, software, or a combination of hardware and software configured to perform one or more corresponding functions. For example, the system 300 may include a marine electronics device of a first watercraft 302 (e.g., controller) and various sensors/system.

The marine electronics device of the first watercraft 302, controller, remote control, MFD, and/or user interface display may include a processor 304, a memory 312, a communication interface 314, a user interface 308, and a display 310. The processor 304 may be in communication with one or more devices such as motor 330, sonar system 332, GPS 334, radar 328, autopilot navigation 326, position sensor 320, and/or other sensors 322 to determine a desired second position of a watercraft such that a desired relative positioning of watercrafts is complied with and/or to determine instructions to cause the watercraft to move to a desired position, and to subsequently cause the watercraft to move to the desired second position.

For example, the radar sensor 328 (or any other system or sensor) may communicate to the processor 304 that it has detected another vessel such as a second watercraft, and the processor 304 may subsequently accept user input from the user interface 308 indicating that the user would like to implement a desired maneuver that incorporates the second watercraft. The user input received through, e.g., the user interface 308 may include a desired relative positioning of the first watercraft to the second watercraft. In some embodiments, the desired relative positioning may be for refueling purposes or for searching a desired volume of water, and in some other embodiments, the desired relative positioning may be for any other purpose. The processor 304 may then determine a first position of the first watercraft and a first position of the second watercraft using. e.g., the position sensor 320 or the radar sensor 328. In some embodiments, the marine electronics device of the first watercraft 302 may communicate directly with the marine electronics device of the second watercraft 324 to obtain the first position of the second watercraft, or in some other embodiments, the marine electronics device of the first watercraft 302 may detect the first location of the second watercraft without communicating with the marine electronics device of the second watercraft 324. The processor 304 may then be usable to determine a desired second position of the second watercraft such that the first watercraft and the second watercraft comply with the desired relative positioning when the second watercraft is in the desired second position. The processor 304 may then be usable to determine, based on the desired second position of the second watercraft, instructions to cause the second watercraft to move to the desired second position. The processor 304 may then cause the second watercraft to move to the desired second position by, e.g., sending the instructions to the marine electronics device of the second watercraft 324. The processor 304 may then use, e.g., the autopilot navigation 326, radar sensor 328, GPS 334, and/or other sensors 322 to navigate the waterway, and as it does so, it may continue to send updated instructions to the marine electronics device of the second watercraft 324 such that the desired relative positioning of the first watercraft to the second watercraft is maintained.

In some embodiments, the system 300 may be configured to receive, process, and display various types of marine data. In some embodiments, the system 300 may include one or more processors 304 and a memory 312. Additionally, the system 300 may include one or more components that are configured to gather marine data or perform marine features. In such a regard, the processor 304 may be configured to process the marine data and generate one or more images corresponding to the marine data for display on the screen that is integrated in the marine electronics device. Further, the system 300 may be configured to communicate with various internal or external components (e.g., through the communication interface 314), such as to provide instructions related to the marine data.

The processor 304 may be any means configured to execute various programmed operations or instructions stored in a memory, such as a device and/or circuitry operating in accordance with software or otherwise embodied in hardware or a combination thereof (e.g., a processor operating under software control, a processor embodied as an application specific integrated circuit (ASIC) or field programmable gate array (FPGA) specifically configured to perform the operations described herein, or a combination thereof) thereby configuring the device or circuitry to perform the corresponding functions of the processor 304 as described herein. In this regard, the processor 304 may be configured to analyze electrical signals communicated thereto to provide, e.g., display data to the display to indicate the direction of the sonar system 332 relative to the watercraft.

In some example embodiments, the processor 304 may be configured to receive sonar data indicative of the size, location, shape, etc. of objects detected by the system 300. For example, the processor 304 may be configured to adjust a position of the sonar system 332 according to a desired maneuver, receive sonar return data, and process the sonar return data to generate sonar image data for display to a user (e.g., on display 310). In some embodiments, the processor 304 may be further configured to implement signal processing and/or enhancement features to improve the display characteristics, data, and/or images, to collect and/or process additional data (e.g., time, temperature, GPS information, waypoint designations), and/or to filter extraneous data to better analyze the collected data. In some embodiments, the processor 304 may further implement notices and/or alarms (e.g., alerts determined or adjusted by a user) to reflect depth measurements, the presence of fish, the proximity of other watercrafts, status or notifications for peripheral devices/systems, etc. The processor 304 and memory 312 may form processing circuitry.

The memory 312 may be configured to store instructions, computer program code, marine data (e.g., sonar data, chart data, location/position data), and/or other data associated with the system 300 in a non-transitory computer readable medium for use by the processor, for example.

The system 300 may also include one or more communications modules configured to communicate via any of many known manners, such as via a network, for example. The processing circuitry and communication interface 314 may form a processing circuitry/communication interface. The communication interface 314 may be configured to enable connections to external systems (e.g., an external network 306 or one or more remote controls, such as a handheld remote control, marine electronics device, foot pedal, or other remote computing device). In this regard, the communication interface (e.g., 314) may include one or more of a plurality of different communication backbones or frameworks, such as Ethernet, USB, CAN, NMEA 2000, GPS, Sonar, cellular, WiFi, and/or other suitable networks, for example. In this manner, the processor 304 may retrieve stored data from a remote, external server via the external network 306 in addition to or as an alternative to the onboard memory 312. The network may also support other data sources, including GPS, autopilot, engine data, compass, radar, etc. Numerous other peripheral, remote devices 316 such as one or more wired or wireless multi-function displays may be connected to the system 300.

The processor 304 may configure the device and/or circuitry to perform the corresponding functions of the processor 304 as described herein. In this regard, the processor 304 may be configured to analyze electrical signals communicated thereto to provide, for example, various features/functions described herein.

In some embodiments, the system 300 may be configured to determine the location(s) of the first watercraft and/or the second watercraft, such as through a location sensor. The system 300 may comprise, or be associated with, a navigation system that includes the location sensor. For example, the location sensor may comprise a GPS, bottom contour, inertial navigation system, such as a micro-electro-mechanical system (MEMS) sensor, a ring laser gyroscope, or the like, or other location detection system. In such a regard, the processor 304 may be configured to act as a navigation system. For example, the processor 304 may generate at least one waypoint and, in some cases, generate an image of a chart along with the waypoint for display by the screen. Additionally or alternatively, the processor may generate one or more routes associated with the watercraft(s). The location of the vessel(s), waypoints, and/or routes may be displayed on a navigation chart on a display remote from the system 300. Further, additional navigation features (e.g., providing directions, weather information, etc.) are also contemplated.

In addition to position, navigation, and sonar data, example embodiments of the present disclosure contemplate receipt, processing, and generation of images that include other marine data. For example, the display 310 and/or user interface 308 (and/or a display and/or a user interface of the marine electronics device of the second watercraft 324) may be configured to display images associated with vessel or motor status (e.g., gauges) or other marine data.

In any of the embodiments, the display 310 may be configured to display an indication of the current direction of the watercraft.

The display 310 may be configured to display images and may include or otherwise be in communication with a user interface 308 configured to receive input from a user. The display 310 may be, for example, a conventional liquid crystal display (LCD), LED/OLED display, touchscreen display, mobile media device, and/or any other suitable display known in the art, upon which images may be displayed. In some embodiments, the display 310 may be the MFD and/or the user's mobile media device. The display may be integrated into the marine electronic device of the first watercraft 302. In some example embodiments, additional displays may also be included, such as a touch screen display, mobile media device, or any other suitable display known in the art upon which images may be displayed.

In some embodiments, the display 310 may present one or more sets of marine data and/or images generated therefrom. Such marine data may include chart data, radar data, weather data, location data, position data, orientation data, sonar data, and/or any other type of information relevant to the watercraft. In some embodiments, the display 310 may be configured to present marine data simultaneously as one or more layers and/or in split-screen mode. In some embodiments, the user may select various combinations of the marine data for display. In other embodiments, various sets of marine data may be superimposed or overlaid onto one another. For example, a route may be applied to (or overlaid onto) a chart (e.g., a map or navigation chart). Additionally, or alternatively, depth information, weather information, radar information, sonar information, and/or any other display inputs may be applied to and/or overlaid onto one another.

In some embodiments, the display 310 and/or user interface 308 may be a screen that is configured to merely present images and not receive user input. In other embodiments, the display and/or user interface 308 may be a user interface such that it is configured to receive user input in some form. For example, the screen may be a touchscreen that enables touch input from a user. Additionally, or alternatively, the user interface may include one or more buttons (not shown) that enable user input.

The user interface 308 may include, for example, a keyboard, keypad, function keys, mouse, scrolling device, input/output ports, touch screen, or any other mechanism by which a user may interface with the system.

In some embodiments, the system 300 may comprise an autopilot navigation 326 that is configured to operate the motor 330 and/or a trolling motor to propel the watercraft in a direction and at a speed. In some embodiments, the autopilot navigation 326 may direct the watercraft to a waypoint (e.g., a latitude and longitude coordinate). Additionally, or alternatively, the autopilot may be configured to direct the watercraft along a route, such as in conjunction with the navigation system. The processor 304 may generate display data based on the autopilot operating mode and cause an indication of the autopilot operating mode to be displayed on the digital display in the first portion, such as an autopilot icon.

In some embodiments, the system 300 may comprise a sonar system 332 including a sonar transducer assembly, which may be any type of sonar transducer (e.g., a downscan transducer, a sidescan transducer, a transducer array (e.g., for forming live sonar), among many others known to one of ordinary skill in the art). The sonar transducer assembly may be housed in the sonar system 332 and configured to gather sonar data from the underwater environment relative to the watercraft. Accordingly, the processor 304 (such as through execution of computer program code) may be configured to adjust an orientation of the sonar transducer assembly within the sonar system 332 (e.g., according to a desired maneuver) and receive an indication of operation of the sonar transducer assembly. The processor 304 may generate additional display data indicative of the operation of the sonar transducer and cause the display data to be displayed on the digital display. For example, a sonar icon (not shown) may be energized to indicate that the sonar transducer is operating.

In some embodiments, the sonar system 332 may be used to determine depth and bottom topography, detect fish, locate wreckage, etc. Sonar beams, from a sonar transducer assembly, can be transmitted into the underwater environment. The sonar signals reflect off objects in the underwater environment (e.g., fish, structure, sea floor bottom, etc.) and return to the sonar transducer assembly, which converts the sonar returns into sonar data that can be used to produce an image of the underwater environment.

In an example embodiment, the system 300 may include a speed sensor, such as an electromagnetic speed sensor, paddle wheel speed sensor, or the like. The speed sensor may be configured to measure the speed of the watercraft through the water. The processor 304 may receive speed data from the speed sensor and generate additional display data indicative of the speed of the watercraft through the water. The speed data may be displayed, such as in text format on the first portion of the digital display. The speed data may be displayed in any relevant unit, such as miles per hour, kilometers per hour, feet per minute, or the like. In some instances, a unit identifier, such as a plurality of LEDs, may be provided in association with the display (may be shown in normal text or with a seven digit display). The processor 304 may cause an LED associated with the appropriate unit for the speed data to be illuminated.

In some embodiments, the system 300 further includes a power source (e.g., battery) that is configured to provide power to the various components. In some embodiments, the power source is rechargeable. In some example embodiments, the system 300 includes a battery sensor. The battery sensor may include a current sensor or voltage sensor configured to measure the current charge of a battery power supply of the system 300 (e.g., the power source). The battery sensor may be configured to measure individual battery cells or measure a battery bank. The processor 304 may receive battery data from the battery sensor and determine the remaining charge on the battery. In an example embodiment, the voltage or current measured by the battery sensor may be compared to a reference value or data table, stored in memory 312, to determine the remaining charge on the battery.

In some embodiments, the system 300 may include other sensors such as other sensors 322. For example, in some embodiments, the system 300 may include an accelerometer for measuring acceleration data, which may be logged by the processor. The acceleration data may be utilized, e.g., for determining instructions to send to the marine electronics device of the second watercraft 324 to maintain the desired relative positioning of the first watercraft to the second watercraft.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in general context of computer-executable instructions, such as program modules, being executed by a computer. Generally, program modules may include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some instances, program modules may be implemented on separate computing systems and/or devices adapted to communicate with one another. Further, a program module may be some combination of hardware and software where particular tasks performed by the program module may be done either through hardware, software, or both.

The various technologies described herein may be implemented in the context of marine electronics, such as devices found in watercrafts and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network (e.g., by hard-wired links, wireless links, or combinations thereof). In a distributed computing environment, program modules may be located in both local and remote computer storage media including memory storage devices.

The system 300 may include a computing device or system 318 (e.g., mobile media device) into which implementations of various technologies and techniques described herein may be implemented. Computing device 318 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

In various implementations, each marine electronic device described herein may be referred to as a marine device or as an MFD. The marine electronic device of the first watercraft 302 may include one or more components disposed at various locations on a watercraft. Such components may include one or more data modules, sensors, instrumentation, and/or any other devices known to those skilled in the art that may transmit various types of data to the marine electronic device of the first watercraft 302 for processing and/or display. The various types of data transmitted to the marine electronic device of the first watercraft 302 may include marine electronics data and/or other data types known to those skilled in the art. The marine data received from the marine electronic device of the first watercraft 302 or system 300 may include LIDAR data, data from vision systems, chart data, sonar data, structure data, radar data, navigation data, position data, heading data, automatic identification system (AIS) data, Doppler data, speed data, course data, or any other type known to those skilled in the art.

In one implementation, the marine electronic device of the first watercraft 302 may include a radar sensor 328 for recording the radar data and/or the Doppler data, a compass heading sensor for recording the heading data, and a position sensor 320 for recording the position data. In another implementation, the marine electronic device of the first watercraft 302 may include a sonar transducer (e.g., within sonar system 332) for recording the sonar data, an AIS transponder for recording the AIS data 319, a paddlewheel sensor for recording the speed data, and/or the like.

The marine electronic device of the first watercraft 302 may receive external data via a LAN or a WAN. In some implementations, external data may relate to information not available from various marine electronics systems. The external data may be retrieved from various sources, such as, e.g., the Internet or any other source. The external data may include atmospheric temperature, atmospheric pressure, tidal data, weather, temperature, moon phase, sunrise, sunset, water levels, historic fishing data, and/or various other fishing and/or trolling related data and information.

The marine electronic device of the first watercraft 302 may be attached to various buses and/or networks, such as a National Marine Electronics Association (NMEA) bus or network, for example. The marine electronic device of the first watercraft 302 may send or receive data to or from another device attached to the NMEA 2000 bus. For instance, the marine electronic device of the first watercraft 302 may transmit commands and receive data from a motor or a sensor using an NMEA 2000 bus. In some implementations, the marine electronic device of the first watercraft 302 may be capable of steering a watercraft and controlling the speed of the watercraft (e.g., autopilot). For instance, one or more waypoints may be input to the marine electronic device of the first watercraft 302, and the marine electronic device of the first watercraft 302 may be configured to steer the watercraft to the one or more waypoints. Further, the marine electronic device of the first watercraft 302 may be configured to transmit and/or receive NMEA 2000 compliant messages, messages in a proprietary format that do not interfere with NMEA 2000 compliant messages or devices, and/or messages in any other format. In various other implementations, the marine electronic device of the first watercraft 302 may be attached to various other communication buses and/or networks configured to use various other types of protocols that may be accessed via, e.g., NMEA 2000, NMEA 0183, Ethernet, Proprietary wired protocol, etc. In some implementations, the marine electronic device of the first watercraft 302 may communicate with various other devices on the watercraft via wireless communication channels and/or protocols.

In some implementations, the marine electronic device of the first watercraft 302 may be connected to a global positioning system (GPS) receiver such as GPS 334. The marine electronic device of the first watercraft 302 and/or the GPS receiver may be connected via a network interface. In this instance, the GPS receiver may be used to determine position and coordinate data for the first watercraft on which the marine electronic device of the first watercraft 302 is disposed. In some instances, the GPS receiver may transmit position coordinate data to the marine electronic device of the first watercraft 302. In various other instances, any type of known positioning system may be used to determine and/or provide position coordinate data to/for the marine electronic device of the first watercraft 302.

The marine electronic device of the first watercraft 302 may be configured as a computing system similar to computing device 318.

FIG. 9 shows a block diagram of an example system 400 capable for use with several embodiments of the present disclosure. As shown, the system 400 may include a number of different modules or components, each of which may comprise any device or means embodied in either hardware, software, or a combination of hardware and software configured to perform one or more corresponding functions. For example, the system 400 may include a marine electronics device of a second watercraft 402 (e.g., controller) and various sensors/system.

The marine electronics device of the second watercraft 402, controller, remote control, MFD, and/or user interface display may include a processor 404, a memory 412, a communication interface 414, a user interface 408, and a display 410. The processor 404 may be in communication with one or more devices such as motor 430, sonar system 432, GPS 434, radar 428, autopilot navigation 426, position sensor 420, and/or other sensors 422 to determine a desired second position of a watercraft such that a desired relative positioning of watercrafts is complied with and/or to determine instructions to cause the watercraft to move to a desired position, and to subsequently cause the watercraft to move to the desired second position.

For example, the radar sensor 428 (or any other system or sensor) may communicate to the processor 404 that it has detected another vessel such as a first watercraft, and the processor 404 may subsequently accept user input from the user interface 408 indicating that the user would like to implement a desired maneuver that incorporates the second watercraft. The user input received through, e.g., the user interface 408 may include a desired relative positioning of the first watercraft to the second watercraft. In some embodiments, the desired relative positioning may be for refueling purposes or for searching a desired volume of water, and in some other embodiments, the desired relative positioning may be for any other purpose. The processor 404 may then determine a first position of the first watercraft and a first position of the second watercraft using, e.g., the position sensor 420 or the radar sensor 428. In some embodiments, the marine electronics device of the second watercraft 402 may communicate directly with the marine electronics device of the first watercraft 424 to obtain the first position of the first watercraft, or in some other embodiments, the marine electronics device of the second watercraft 402 may detect the first location of the first watercraft without communicating with the marine electronics device of the first watercraft 424. The processor 404 may then be usable to determine a desired second position of the second watercraft such that the first watercraft and the second watercraft comply with the desired relative positioning when the second watercraft is in the desired second position. The processor 404 may then be usable to determine, based on the desired second position of the second watercraft, instructions to cause the second watercraft to move to the desired second position. The processor 404 may then cause the second watercraft to move to the desired second position by, e.g., sending the instructions to the required components such as the motor 430, the sonar system 432, etc.

The processor 404 may then use, e.g., the autopilot navigation 426, radar sensor 428, GPS 434, and/or other sensors 422 to monitor the waterway, and as it does so, it may continue to update the desired second position of the second watercraft and the instructions, accordingly, such that the desired relative positioning of the first watercraft to the second watercraft is maintained. For example, as discussed herein with respect to FIG. 5A-5C, the processor 404 may be configured to detect an obstacle in the desired path of the second watercraft, determine instructions to cause the second watercraft to temporarily deviate from the desired maneuver and overcome the detected obstacle, and then cause the second watercraft to return back to operating within the desired maneuver. Additionally, the processor 404 may be configured to continually receive and communicate with components such as the GPS 434, radar sensor 428, autopilot navigation 426, and sonar system 432, among others. Using that marine data, the processor 404 may further be configured to cause the second watercraft to move such that the second watercraft follows the first watercraft in a way that dynamically changes.

In some embodiments, the system 400 may be configured to receive, process, and display various types of marine data. In some embodiments, the system 400 may include one or more processors 404 and a memory 412. Additionally, the system 400 may include one or more components that are configured to gather marine data or perform marine features. In such a regard, the processor 404 may be configured to process the marine data and generate one or more images corresponding to the marine data for display on the screen that is integrated in the marine electronics device. Further, the system 400 may be configured to communicate with various internal or external components (e.g., through the communication interface 414), such as to provide instructions related to the marine data.

The processor 404 may be any means configured to execute various programmed operations or instructions stored in a memory, such as a device and/or circuitry operating in accordance with software or otherwise embodied in hardware or a combination thereof (e.g., a processor operating under software control, a processor embodied as an application specific integrated circuit (ASIC) or field programmable gate array (FPGA) specifically configured to perform the operations described herein, or a combination thereof) thereby configuring the device or circuitry to perform the corresponding functions of the processor 404 as described herein. In this regard, the processor 404 may be configured to analyze electrical signals communicated thereto to provide, e.g., display data to the display to indicate the direction of the sonar system 432 relative to the watercraft.

In some example embodiments, the processor 404 may be configured to receive sonar data indicative of the size, location, shape, etc. of objects detected by the system 400.

For example, the processor 404 may be configured to adjust a position of the sonar system 432 according to a desired maneuver, receive sonar return data, and process the sonar return data to generate sonar image data for display to a user (e.g., on display 410). In some embodiments, the processor 404 may be further configured to implement signal processing and/or enhancement features to improve the display characteristics, data, and/or images, to collect and/or process additional data (e.g., time, temperature, GPS information, waypoint designations), and/or to filter extraneous data to better analyze the collected data. In some embodiments, the processor 404 may further implement notices and/or alarms (e.g., alerts determined or adjusted by a user) to reflect depth measurements, the presence of fish, the proximity of other watercrafts, status or notifications for peripheral devices/systems, etc. The processor 404 and memory 412 may form processing circuitry.

The memory 412 may be configured to store instructions, computer program code, marine data (e.g., sonar data, chart data, location/position data), and/or other data associated with the system 400 in a non-transitory computer readable medium for use by the processor, for example.

The system 400 may also include one or more communications modules configured to communicate via any of many known manners, such as via a network, for example. The processing circuitry and communication interface 414 may form a processing circuitry/communication interface. The communication interface 414 may be configured to enable connections to external systems (e.g., an external network 406 or one or more remote controls, such as a handheld remote control, marine electronics device, foot pedal, or other remote computing device). In this regard, the communication interface (e.g., 414) may include one or more of a plurality of different communication backbones or frameworks, such as Ethernet, USB, CAN, NMEA 2000, GPS, Sonar, cellular, WiFi, and/or other suitable networks, for example. In this manner, the processor 404 may retrieve stored data from a remote, external server via the external network 406 in addition to or as an alternative to the onboard memory 412. The network may also support other data sources, including GPS, autopilot, engine data, compass, radar, etc. Numerous other peripheral, remote devices 416 such as one or more wired or wireless multi-function displays may be connected to the system 400.

The processor 404 may configure the device and/or circuitry to perform the corresponding functions of the processor 404 as described herein. In this regard, the processor 404 may be configured to analyze electrical signals communicated thereto to provide, for example, various features/functions described herein.

In some embodiments, the system 400 may be configured to determine the location(s) of the first watercraft and/or the second watercraft, such as through a location sensor. The system 400 may comprise, or be associated with, a navigation system that includes the location sensor. For example, the location sensor may comprise a GPS, bottom contour, inertial navigation system, such as a micro-electro-mechanical system (MEMS) sensor, a ring laser gyroscope, or the like, or other location detection system. In such a regard, the processor 404 may be configured to act as a navigation system. For example, the processor 404 may generate at least one waypoint and, in some cases, generate an image of a chart along with the waypoint for display by the screen. Additionally or alternatively, the processor may generate one or more routes associated with the watercraft(s). The location of the vessel(s), waypoints, and/or routes may be displayed on a navigation chart on a display remote from the system 400. Further, additional navigation features (e.g., providing directions, weather information, etc.) are also contemplated.

In addition to position, navigation, and sonar data, example embodiments of the present disclosure contemplate receipt, processing, and generation of images that include other marine data. For example, the display 410 and/or user interface 408 (and/or a display and/or a user interface of the marine electronics device of the first watercraft 424) may be configured to display images associated with vessel or motor status (e.g., gauges) or other marine data.

In any of the embodiments, the display 410 may be configured to display an indication of the current direction of the watercraft.

The display 410 may be configured to display images and may include or otherwise be in communication with a user interface 408 configured to receive input from a user. The display 410 may be, for example, a conventional liquid crystal display (LCD), LED/OLED display, touchscreen display, mobile media device, and/or any other suitable display known in the art, upon which images may be displayed. In some embodiments, the display 410 may be the MFD and/or the user's mobile media device. The display may be integrated into the marine electronic device of the second watercraft 402. In some example embodiments, additional displays may also be included, such as a touch screen display, mobile media device, or any other suitable display known in the art upon which images may be displayed.

In some embodiments, the display 410 may present one or more sets of marine data and/or images generated therefrom. Such marine data may include chart data, radar data, weather data, location data, position data, orientation data, sonar data, and/or any other type of information relevant to the watercraft. In some embodiments, the display 410 may be configured to present marine data simultaneously as one or more layers and/or in split-screen mode. In some embodiments, the user may select various combinations of the marine data for display. In other embodiments, various sets of marine data may be superimposed or overlaid onto one another. For example, a route may be applied to (or overlaid onto) a chart (e.g., a map or navigation chart). Additionally, or alternatively, depth information, weather information, radar information, sonar information, and/or any other display inputs may be applied to and/or overlaid onto one another.

In some embodiments, the display 410 and/or user interface may be a screen that is configured to merely present images and not receive user input. In other embodiments, the display and/or user interface 408 may be a user interface such that it is configured to receive user input in some form. For example, the screen may be a touchscreen that enables touch input from a user. Additionally, or alternatively, the user interface may include one or more buttons (not shown) that enable user input.

The user interface 408 may include, for example, a keyboard, keypad, function keys, mouse, scrolling device, input/output ports, touch screen, or any other mechanism by which a user may interface with the system.

In some embodiments, the system 400 may comprise an autopilot navigation 426 that is configured to operate the motor 430 and/or a trolling motor to propel the watercraft in a direction and at a speed. For example, as described herein with reference to FIGS. 5A-5C, in some embodiments, the autopilot navigation 426 may direct the watercraft around an obstacle such as an island or rock. Additionally, or alternatively, the autopilot may be configured to direct the watercraft along a route, such as in conjunction with the navigation system, for the same or similar purposes. The processor 404 may generate display data based on the autopilot operating mode and cause an indication of the autopilot operating mode to be displayed on the digital display in the first portion, such as an autopilot icon. Notably, the system 400 may be configured to allow the second watercraft to be temporarily controlled by the autopilot navigation 426 to overcome an obstacle before later returning to being controlled by the processor 404 to operate within the instructions corresponding to the desired maneuver.

In some embodiments, the system 400 may comprise a sonar system 432 including a sonar transducer assembly, which may be any type of sonar transducer (e.g., a downscan transducer, a sidescan transducer, a transducer array (e.g., for forming live sonar), among many others known to one of ordinary skill in the art). The sonar transducer assembly may be housed in the sonar system 432 and configured to gather sonar data from the underwater environment relative to the watercraft. Accordingly, the processor 404 (such as through execution of computer program code) may be configured to adjust an orientation of the sonar transducer assembly within the sonar system 432 (e.g., according to a desired maneuver) and receive an indication of operation of the sonar transducer assembly. The processor 404 may generate additional display data indicative of the operation of the sonar transducer and cause the display data to be displayed on the digital display. For example, a sonar icon (not shown) may be energized to indicate that the sonar transducer is operating.

In some embodiments, the sonar system 432 may be used to determine depth and bottom topography, detect fish, locate wreckage, etc. Sonar beams, from a sonar transducer assembly, can be transmitted into the underwater environment. The sonar signals reflect off objects in the underwater environment (e.g., fish, structure, sea floor bottom, etc.) and return to the sonar transducer assembly, which converts the sonar returns into sonar data that can be used to produce an image of the underwater environment.

In an example embodiment, the system 400 may include a speed sensor, such as an electromagnetic speed sensor, paddle wheel speed sensor, or the like. The speed sensor may be configured to measure the speed of the watercraft through the water. The processor 404 may receive speed data from the speed sensor and generate additional display data indicative of the speed of the watercraft through the water. The speed data may be displayed, such as in text format on the first portion of the digital display. The speed data may be displayed in any relevant unit, such as miles per hour, kilometers per hour, feet per minute, or the like. In some instances, a unit identifier, such as a plurality of LEDs, may be provided in association with the display (may be shown in normal text or with a seven digit display). The processor 404 may cause an LED associated with the appropriate unit for the speed data to be illuminated.

In some embodiments, the system 400 further includes a power source (e.g., battery) that is configured to provide power to the various components. In some embodiments, the power source is rechargeable. In some example embodiments, the system 400 includes a battery sensor. The battery sensor may include a current sensor or voltage sensor configured to measure the current charge of a battery power supply of the system 400 (e.g., the power source). The battery sensor may be configured to measure individual battery cells or measure a battery bank. The processor 404 may receive battery data from the battery sensor and determine the remaining charge on the battery. In an example embodiment, the voltage or current measured by the battery sensor may be compared to a reference value or data table, stored in memory 412, to determine the remaining charge on the battery.

In some embodiments, the system 400 may include other sensors such as other sensors 422. For example, in some embodiments, the system 400 may include an accelerometer for measuring acceleration data, which may be logged by the processor. The acceleration data may be utilized, e.g., for determining instructions to send to, e . . . , the motor 430, to cause the second watercraft to maintain the desired relative positioning of the first watercraft to the second watercraft.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in general context of computer-executable instructions, such as program modules, being executed by a computer. Generally, program modules may include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some instances, program modules may be implemented on separate computing systems and/or devices adapted to communicate with one another. Further, a program module may be some combination of hardware and software where particular tasks performed by the program module may be done either through hardware, software, or both.

The various technologies described herein may be implemented in the context of marine electronics, such as devices found in watercrafts and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network (e.g., by hardwired links, wireless links, or combinations thereof). In a distributed computing environment, program modules may be located in both local and remote computer storage media including memory storage devices.

The system 400 may include a computing device or system 418 (e.g., mobile media device) into which implementations of various technologies and techniques described herein may be implemented. Computing device 418 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

In various implementations, each marine electronic device described herein may be referred to as a marine device or as an MFD. The marine electronic device of the second watercraft 402 may include one or more components disposed at various locations on a watercraft. Such components may include one or more data modules, sensors, instrumentation, and/or any other devices known to those skilled in the art that may transmit various types of data to the marine electronic device of the second watercraft 402 for processing and/or display. The various types of data transmitted to the marine electronic device of the second watercraft 402 may include marine electronics data and/or other data types known to those skilled in the art. The marine data received from the marine electronic device of the second watercraft 402 or system 400 may include LIDAR data, data from vision systems, chart data, sonar data, structure data, radar data, navigation data, position data, heading data, automatic identification system (AIS) data, Doppler data, speed data, course data, or any other type known to those skilled in the art.

In one implementation, the marine electronic device of the second watercraft 402 may include a radar sensor 428 for recording the radar data and/or the Doppler data, a compass heading sensor for recording the heading data, and a position sensor 420 for recording the position data. In another implementation, the marine electronic device of the second watercraft 402 may include a sonar transducer (e.g., within sonar system 432) for recording the sonar data, an AIS transponder for recording the AIS data 419, a paddlewheel sensor for recording the speed data, and/or the like.

The marine electronic device of the second watercraft 402 may receive external data via a LAN or a WAN. In some implementations, external data may relate to information not available from various marine electronics systems. The external data may be retrieved from various sources, such as, e.g., the Internet or any other source. The external data may include atmospheric temperature, atmospheric pressure, tidal data, weather, temperature, moon phase, sunrise, sunset, water levels, historic fishing data, and/or various other fishing and/or trolling related data and information.

The marine electronic device of the second watercraft 402 may be attached to various buses and/or networks, such as a National Marine Electronics Association (NMEA) bus or network, for example. The marine electronic device of the second watercraft 402 may send or receive data to or from another device attached to the NMEA 2000 bus. For instance, the marine electronic device of the second watercraft 402 may transmit commands and receive data from a motor or a sensor using an NMEA 2000 bus. In some implementations, the marine electronic device of the second watercraft 402 may be capable of steering a watercraft and controlling the speed of the watercraft (e.g., autopilot). For instance, one or more waypoints may be input to the marine electronic device of the second watercraft 402, and the marine electronic device of the second watercraft 402 may be configured to steer the watercraft to the one or more waypoints. Further, the marine electronic device of the second watercraft 402 may be configured to transmit and/or receive NMEA 2000 compliant messages, messages in a proprietary format that do not interfere with NMEA 2000 compliant messages or devices, and/or messages in any other format. In various other implementations, the marine electronic device of the second watercraft 402 may be attached to various other communication buses and/or networks configured to use various other types of protocols that may be accessed via, e.g., NMEA 2000, NMEA 0183, Ethernet, Proprietary wired protocol, etc. In some implementations, the marine electronic device of the second watercraft 402 may communicate with various other devices on the watercraft via wireless communication channels and/or protocols.

In some implementations, the marine electronic device of the second watercraft 402 may be connected to a global positioning system (GPS) receiver such as GPS 434. The marine electronic device of the second watercraft 402 and/or the GPS receiver may be connected via a network interface. In this instance, the GPS receiver may be used to determine position and coordinate data for the watercraft on which the marine electronic device of the second watercraft 402 is disposed. In some instances, the GPS receiver may transmit position coordinate data to the marine electronic device of the first watercraft 424 using the marine electronic device of the second watercraft 402. In various other instances, any type of known positioning system may be used to determine and/or provide position coordinate data to/for the marine electronic device of the second watercraft 402 and/or the marine electronics device of the first watercraft 424.

The marine electronic device of the second watercraft 402 may be configured as a computing system similar to computing device 418.

FIG. 10 shows a block diagram of an example system 500 capable for use with several embodiments of the present disclosure. As shown, the system 500 may include a number of different modules or components, each of which may comprise any device or means embodied in either hardware, software, or a combination of hardware and software configured to perform one or more corresponding functions. For example, the system 500 may include a marine electronics device of a first watercraft 525 (e.g., controller), a marine electronics device of a second watercraft 524 (e.g., controller), and various sensors/system.

The system 500 may include a processor 504, a memory 512, a communication interface 514, a user interface 508, and a display 510. The processor 504 may be in communication with one or more devices such as the marine electronics device of the first watercraft 525, the marine electronics device of the second watercraft 524, GPS 534, radar 528, autopilot navigation 526, and/or other sensors 522 to determine desired second position(s) of watercraft(s) such that a desired relative positioning of watercrafts is complied with and/or to determine instructions to cause the watercraft(s) to move to the desired second position(s), and to subsequently cause the watercraft(s) to move to the desired second position(s).

For example, the radar sensor 528 (or any other system or sensor) may communicate to the processor 504 that it has detected vessels such as a first watercraft and a second watercraft, and the processor 504 may subsequently accept user input from the user interface 508 indicating that the user would like to implement a desired maneuver that incorporates the first watercraft and the second watercraft. The user input received through, e.g., the user interface 508 may include a desired relative positioning of the first watercraft to the second watercraft. In some embodiments, the desired relative positioning may be for refueling purposes or for searching a desired volume of water, and in some other embodiments, the desired relative positioning may be for any other purpose. The processor 504 may then determine a first position of the first watercraft and a first position of the second watercraft using, e.g., the radar sensor 528. In some embodiments, the marine electronics device of the first watercraft 525 and/or the marine electronics device of the first watercraft 524 may obtain the first position of the first watercraft and/or the first position of the second watercraft through one or more position sensors and then may communicate with the processor 504 to indicate the first position of the first watercraft and/or the first position of the second watercraft. Additionally or alternatively, the marine electronics device of the second watercraft 524 may, for example, detect the first location of the first watercraft without communicating with the marine electronics device of the first watercraft 525. The processor 504 may then be usable to determine a desired second position of at least one of the first watercraft or the second watercraft such that the first watercraft and the second watercraft comply with the desired relative positioning when the watercraft(s) are in the desired second position(s). The processor 504 may then be usable to determine, based on the desired second position(s) of the watercraft(s), instructions to cause the watercraft(s) to move to the desired second position(s). The processor 504 may then cause the watercraft(s) to move to the desired second position(s) by, e.g., sending the instructions to the required components, such as the motor(s) of the watercraft(s), etc.

The processor 404 may then use, e.g., the autopilot navigation 526, radar sensor 528, GPS 534, and/or other sensors 522 to monitor the waterway, and as it does so, it may continue to update the desired second position(s) of the watercrafts and the instructions, accordingly, such that the desired relative positioning of the watercrafts is maintained. For example, as discussed herein with respect to FIG. 5A-5C, the processor 504 may be configured to detect an obstacle in the desired path of the second watercraft, determine instructions to cause the second watercraft to temporarily deviate from the desired maneuver and overcome the detected obstacle, and then cause the second watercraft to return back to operating within the desired maneuver. Additionally, the processor 504 may be configured to continually receive and communicate with components such as the GPS 534, radar sensor 528, and autopilot navigation 526, among others. Using that marine data, the processor 504 may further be configured to cause the watercraft(s) to move such that the first watercraft and the second watercraft comply with the desired maneuver in a way that dynamically changes.

In some embodiments, the system 500 may be configured to receive, process, and display various types of marine data. In some embodiments, the system 500 may include one or more processors 504 and a memory 512. Additionally, the system 500 may include one or more components that are configured to gather marine data or perform marine features. In such a regard, the processor 504 may be configured to process the marine data and generate one or more images corresponding to the marine data to present on the display 510. Further, the system 500 may be configured to communicate with various internal or external components (e.g., through the communication interface 514), such as to provide instructions related to the marine data.

The processor 504 may be any means configured to execute various programmed operations or instructions stored in a memory, such as a device and/or circuitry operating in accordance with software or otherwise embodied in hardware or a combination thereof (e.g., a processor operating under software control, a processor embodied as an application specific integrated circuit (ASIC) or field programmable gate array (FPGA) specifically configured to perform the operations described herein, or a combination thereof) thereby configuring the device or circuitry to perform the corresponding functions of the processor 504 as described herein.

In some example embodiments, the processor 504 may be configured to receive sonar data indicative of the size, location, shape, etc. of objects detected by the system 500. For example, the processor 504 may be configured to adjust a position of a sonar system on a watercraft according to a desired maneuver, receive sonar return data, and process the sonar return data to generate sonar image data for display to a user (e.g., on display 510). In some embodiments, the processor 504 may be further configured to implement signal processing and/or enhancement features to improve the display characteristics, data, and/or images, to collect and/or process additional data (e.g., time, temperature, GPS information, waypoint designations), and/or to filter extraneous data to better analyze the collected data. In some embodiments, the processor 504 may further implement notices and/or alarms (e.g., alerts determined or adjusted by a user) to reflect depth measurements, the presence of fish, the proximity of other watercrafts, status or notifications for peripheral devices/systems, etc. The processor 504 and memory 512 may form processing circuitry.

The memory 512 may be configured to store instructions, computer program code, marine data (e.g., sonar data, chart data, location/position data), and/or other data associated with the system 500 in a non-transitory computer readable medium for use by the processor, for example.

The system 500 may also include one or more communications modules configured to communicate via any of many known manners, such as via a network, for example. The processing circuitry and communication interface 514 may form a processing circuitry/communication interface. The communication interface 514 may be configured to enable connections to external systems (e.g., an external network 506 or one or more remote controls, such as a handheld remote control, marine electronics device(s), foot pedal, or other remote computing device). In this regard, the communication interface (e.g., 514) may include one or more of a plurality of different communication backbones or frameworks, such as Ethernet, USB, CAN, NMEA 2000, GPS, Sonar, cellular, WiFi, and/or other suitable networks, for example. In this manner, the processor 504 may retrieve stored data from a remote, external server via the external network 506 in addition to or as an alternative to the onboard memory 512. The network may also support other data sources, including GPS, autopilot, engine data, compass, radar, etc. Numerous other peripheral, remote devices 516 such as one or more wired or wireless multi-function displays may be connected to the system 500.

The processor 504 may configure the device and/or circuitry to perform the corresponding functions of the processor 504 as described herein. In this regard, the processor 504 may be configured to analyze electrical signals communicated thereto to provide, for example, various features/functions described herein.

In some embodiments, the system 500 may be configured to determine the location(s) of the first watercraft and/or the second watercraft, such as through a location sensor. The system 500 may comprise, or be associated with, a navigation system that includes the location sensor. For example, the location sensor may comprise a GPS, bottom contour, inertial navigation system, such as a micro-electro-mechanical system (MEMS) sensor, a ring laser gyroscope, or the like, or other location detection system. In such a regard, the processor 504 may be configured to act as a navigation system. For example, the processor 504 may generate at least one waypoint and, in some cases, generate an image of a chart along with the waypoint for display by the screen. Additionally or alternatively, the processor may generate one or more routes associated with the watercraft(s). The location of the vessel(s), waypoints, and/or routes may be displayed on a navigation chart on a display remote from the system 500. Further, additional navigation features (e.g., providing directions, weather information, etc.) are also contemplated.

In addition to position, navigation, and sonar data, example embodiments of the present disclosure contemplate receipt, processing, and generation of images that include other marine data. For example, the display 510 and/or user interface 508 may be configured to display images associated with vessel or motor status (e.g., gauges) or other marine data.

In any of the embodiments, the display 510 may be configured to display an indication of a current direction of one or more watercraft(s).

The display 510 may be configured to display images and may include or otherwise be in communication with a user interface 508 configured to receive input from a user. The display 510 may be, for example, a conventional liquid crystal display (LCD), LED/OLED display, touchscreen display, mobile media device, and/or any other suitable display known in the art, upon which images may be displayed. In some embodiments, the display 510 may be the user's mobile media device. In some example embodiments, additional displays may also be included, such as a touch screen display, mobile media device, or any other suitable display known in the art upon which images may be displayed.

In some embodiments, the display 510 may present one or more sets of marine data and/or images generated therefrom. Such marine data may include chart data, radar data, weather data, location data, position data, orientation data, sonar data, and/or any other type of information relevant to the watercraft. In some embodiments, the display 510 may be configured to present marine data simultaneously as one or more layers and/or in split-screen mode. In some embodiments, the user may select various combinations of the marine data for display. In other embodiments, various sets of marine data may be superimposed or overlaid onto one another. For example, a route may be applied to (or overlaid onto) a chart (e.g., a map or navigation chart). Additionally, or alternatively, depth information, weather information, radar information, sonar information, and/or any other display inputs may be applied to and/or overlaid onto one another.

In some embodiments, the display 510 and/or user interface 508 may be a screen that is configured to merely present images and not receive user input. In other embodiments, the display and/or user interface 508 may be a user interface such that it is configured to receive user input in some form. For example, the screen may be a touchscreen that enables touch input from a user. Additionally, or alternatively, the user interface may include one or more buttons (not shown) that enable user input.

The user interface 508 may include, for example, a keyboard, keypad, function keys, mouse, scrolling device, input/output ports, touch screen, or any other mechanism by which a user may interface with the system.

In some embodiments, the system 500 may comprise an autopilot navigation 526 that is configured to send instructions to one of the marine electronics devices of the first watercraft 525 or the marine electronics device of the second watercraft 524 to operate a motor and/or a trolling motor to propel one of the watercrafts in a direction and at a speed. In some embodiments, the autopilot navigation 526 may direct watercraft(s) to a waypoint (e.g., a latitude and longitude coordinate). Additionally, or alternatively, the autopilot may be configured to direct watercraft(s) along a route, such as in conjunction with the navigation system. The processor 504 may generate display data based on the autopilot operating mode and cause an indication of the autopilot operating mode to be displayed on the digital display in the first portion, such as an autopilot icon.

In some embodiments, the system 500 further includes a power source (e.g., battery) that is configured to provide power to the various components. In some embodiments, the power source is rechargeable. In some example embodiments, the system 500 includes a battery sensor. The battery sensor may include a current sensor or voltage sensor configured to measure the current charge of a battery power supply of the system 500 (e.g., the power source). The battery sensor may be configured to measure individual battery cells or measure a battery bank. The processor 504 may receive battery data from the battery sensor and determine the remaining charge on the battery. In an example embodiment, the voltage or current measured by the battery sensor may be compared to a reference value or data table, stored in memory 512, to determine the remaining charge on the battery.

In some embodiments, the system 500 may include other sensors such as other sensors 522.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in general context of computer-executable instructions, such as program modules, being executed by a computer. Generally, program modules may include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some instances, program modules may be implemented on separate computing systems and/or devices adapted to communicate with one another. Further, a program module may be some combination of hardware and software where particular tasks performed by the program module may be done either through hardware, software, or both.

The various technologies described herein may be implemented in the context of marine electronics, such as devices found in watercrafts and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network (e.g., by hardwired links, wireless links, or combinations thereof). In a distributed computing environment, program modules may be located in both local and remote computer storage media including memory storage devices.

The system 500 may include a computing device or system 518 (e.g., mobile media device) into which implementations of various technologies and techniques described herein may be implemented. Computing device 518 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

In various implementations, each marine electronic device described herein may be referred to as a marine device or as an MFD. The marine electronic device of the first watercraft 525 and/or the marine electronic device of the second watercraft 524 may include one or more components disposed at various locations on a watercraft. Such components may include one or more data modules, sensors, instrumentation, and/or any other devices known to those skilled in the art that may transmit various types of data to the marine electronic device of the first watercraft 525 and/or the marine electronic device of the second watercraft 524 for processing and/or display. The various types of data transmitted to the marine electronic device of the first watercraft 525 and/or the marine electronic device of the second watercraft 524 may include marine electronics data and/or other data types known to those skilled in the art. The marine data received from the marine electronic device of the first watercraft 525 and/or the marine electronic device of the second watercraft 524 or system 500 may include LIDAR data, data from vision systems, chart data, sonar data, structure data, radar data, navigation data, position data, heading data, automatic identification system (AIS) data, Doppler data, speed data, course data, or any other type known to those skilled in the art.

In one implementation, the system 500 may include a radar sensor 528 for recording the radar data and/or the Doppler data. In another implementation, the marine electronic device of the first watercraft 525 and/or the marine electronics device of the second watercraft 524 may include a sonar transducer (e.g., within a sonar system) for recording the sonar data, an AIS transponder for recording the AIS data 519, a paddlewheel sensor for recording the speed data, and/or the like.

The marine electronic device of the first watercraft 525 and/or the marine electronic device of the second watercraft 524 may receive external data via a LAN or a WAN. In some implementations, external data may relate to information not available from various marine electronics systems. The external data may be retrieved from various sources, such as, e.g., the Internet or any other source. The external data may include atmospheric temperature, atmospheric pressure, tidal data, weather, temperature, moon phase, sunrise, sunset, water levels, historic fishing data, and/or various other fishing and/or trolling related data and information.

The marine electronic device of the first watercraft 525 and/or the marine electronic device of the second watercraft 524 may be attached to various buses and/or networks, such as a National Marine Electronics Association (NMEA) bus or network, for example. The marine electronic device of the first watercraft 525 and/or the marine electronic device of the second watercraft 524 may send or receive data to or from another device attached to the NMEA 2000 bus. For instance, the marine electronic device of the first watercraft 525 and/or the marine electronic device of the second watercraft 524 may transmit commands and receive data from a motor or a sensor using an NMEA 2000 bus. In some implementations, the marine electronic device of the first watercraft 525 and/or the marine electronic device of the second watercraft 524 may be capable of steering a watercraft and controlling the speed of the watercraft (e.g., autopilot). For instance, one or more waypoints may be input to the marine electronic device of the first watercraft 525 and/or the marine electronic device of the second watercraft 524, and the marine electronic device of the first watercraft 525 and/or the marine electronic device of the second watercraft 524 may be configured to steer the watercraft to the one or more waypoints. Further, the marine electronic device of the first watercraft 525 and/or the marine electronic device of the second watercraft 524 may be configured to transmit and/or receive NMEA 2000 compliant messages, messages in a proprietary format that do not interfere with NMEA 2000 compliant messages or devices, and/or messages in any other format. In various other implementations, the marine electronic device of the first watercraft 525 and/or the marine electronic device of the second watercraft 524 may be attached to various other communication buses and/or networks configured to use various other types of protocols that may be accessed via, e.g., NMEA 2000, NMEA 0183, Ethernet, Proprietary wired protocol, etc. In some implementations, the marine electronic device of the first watercraft 525 and/or the marine electronic device of the second watercraft 524 may communicate with various other devices on the watercraft via wireless communication channels and/or protocols.

In some implementations, the marine electronic device of the first watercraft 525 and/or the marine electronic device of the second watercraft 524 may be connected to a global positioning system (GPS) receiver such as GPS 534. The marine electronic device of the first watercraft 525, the marine electronic device of the second watercraft 524, and/or the GPS receiver may be connected via a network interface. In this instance, the GPS receiver may be used to determine position and coordinate data for the watercrafts on which the marine electronic device of the first watercraft 525 and the marine electronic device of the second watercraft 524 are disposed, respectively. In some instances, the GPS receiver may transmit position coordinate data to the marine electronic device of the first watercraft 525 and/or the marine electronic device of the second watercraft 524. In various other instances, any type of known positioning system may be used to determine and/or provide position coordinate data to/for the marine electronic device of the first watercraft 525 and/or the marine electronic device of the second watercraft 524.

Example Flowchart

Embodiments of the present disclosure provide methods for managing a position of a first watercraft relative to a second watercraft during a desired maneuver. Various examples of the operations performed in accordance with embodiments of the present disclosure will now be provided with reference to FIG. 11.

Figure 11:
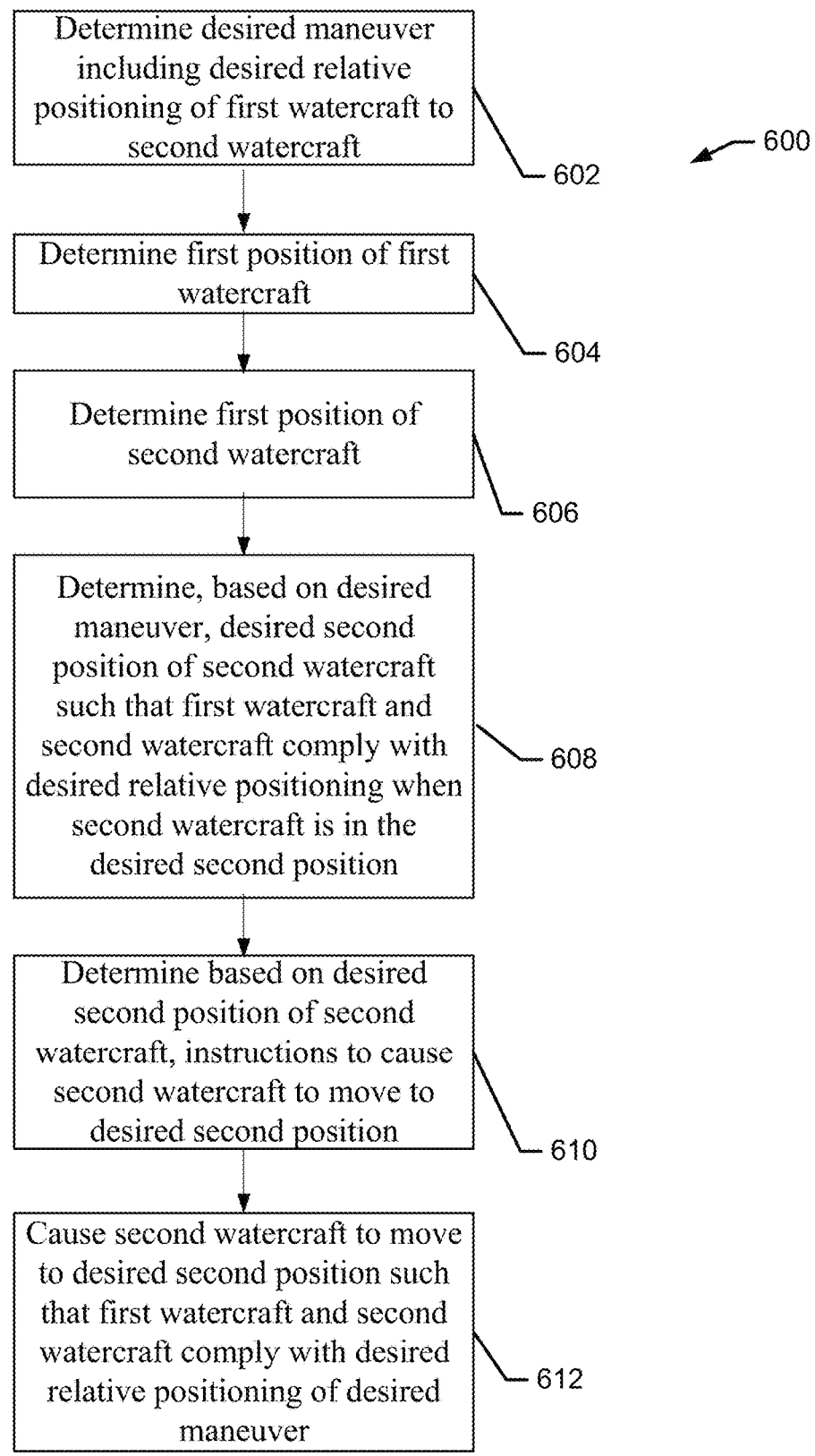
FIG. 11 shows an example method for managing a position of a first watercraft relative to a second watercraft during a desired maneuver, in accordance with some embodiments discussed herein.

FIG. 11 illustrates a flowchart according to an example method 600 for managing a position of a first watercraft relative to a second watercraft during a desired maneuver, according to various example embodiments described herein. The operations illustrated in and described with respect to FIG. 11 may, for example, be performed by, with the assistance of, and/or under the control of one or more of the components described herein, e.g., in relation to system 300, system 400, and/or system 500.

Operation 602 may comprise determining a desired maneuver including a desired relative positioning of a first watercraft to a second watercraft. For example, in some embodiments, operation 602 may include receiving user input indicating the desired maneuver, and the desired maneuver may involve maintaining a first watercraft within a certain position and distance from a second watercraft, maintaining a position of a first watercraft and a second watercraft for refueling purposes, controlling paths of one or more watercrafts to search a desired volume of water, or any other maneuver. The components discussed above with respect to system 300, system 400, and system 500 may, for example, provide means for performing operation 602.

Operation 604 may comprise determining a first position of the first watercraft. In some embodiments, for example, operation 604 may include receiving information from a position sensor or from a radar sensor (the radar sensor being on either of the first watercraft or the second watercraft). The components discussed above with respect to system 300, system 400, and system 500 may, for example, provide means for performing operation 604.

Operation 606 may comprise determining a first position of the second watercraft. In some embodiments, for example, operation 606 may include receiving information from a position sensor or from a radar sensor (the radar sensor being on either of the first watercraft or the second watercraft). The components discussed above with respect to system 300, system 400, and system 500 may, for example, provide means for performing operation 606.

Operation 608 may comprise determining, based on the desired maneuver, a desired second position of the second watercraft such that the first watercraft and the second watercraft comply with the desired relative positioning when the second watercraft is in the desired second position. For example, operation 608 may involve using a processor to process information associated with the desired maneuver to calculate the desired second position. The components discussed above with respect to system 300, system 400, and system 500 may, for example, provide means for performing operation 608.

Operation 610 may include determining, based on the desired second position of the second watercraft, instructions to cause the second watercraft to move to the desired second position. For example, operation 610 may involve using a processor to calculate instructions designed to cause the second watercraft to move to the desired second position. In some embodiments, operation 610 may additionally involve incorporating other components such as radar to determine instructions that prevent the second watercraft from running into detected obstacles on the way to the desired second position. The components discussed above with respect to system 300, system 400, and system 500 may, for example, provide means for performing operation 610.

Operation 612 may include causing the second watercraft to move to the desired second position such that the first watercraft and the second watercraft comply with the desired relative positioning of the desired maneuver. In some embodiments, operation 612 may include sending a signal to the second watercraft that instructs the second watercraft to alter at least one of a speed or a direction of the second watercraft such that the first watercraft and the second watercraft comply with the desired relative positioning of the desired maneuver. For example, operation 612 may involve using a processor to cause the second watercraft to move to the desired second position by causing communication between the processor (which may or may not be incorporated within a marine electronic device) and another marine electronic device. In other embodiments, operation 612 may include causing at least one of a speed or a direction of the second watercraft to be altered such that the first watercraft and the second watercraft comply with the desired relative positioning of the desired maneuver. For example, operation 612 may involve using a processor to cause the second watercraft to move to the desired second position by causing communication between the processor (which may or may not be incorporated within a marine electronic device) and one or more components such as a motor. Further, in some embodiments, operation 612 may also additionally involve incorporating other components such as radar to prevent the second watercraft from running into detected obstacles on the way to the desired second position. The components discussed above with respect to system 300, system 400, and system 500 may, for example, provide means for performing operation 612.

FIG. 11 illustrates a flowchart of a system, method, and/or computer program product according to an example embodiment. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 312, the memory 412, or the memory 512 and executed by, for example, the processor 304, the processor 404, or the processor 504. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

In some embodiments, the method for operating various marine devices may include additional, optional operations, and/or the operations described above may be modified or augmented.

Conclusion

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A system for managing a position of a first watercraft relative to a second watercraft during a desired maneuver, the system comprising:
   a processor; and
   a memory including computer executable instructions, the computer executable instructions configured to, when executed by the processor, cause the processor to:
      determine a desired maneuver including a desired relative positioning of the first watercraft to the second watercraft;
      determine a first position of the first watercraft;
      determine a first position of the second watercraft;
      determine, based on the desired maneuver, a desired second position of the second watercraft such that the first watercraft and the second watercraft comply with the desired relative positioning when the second watercraft is in the desired second position;
      determine, based on the desired second position of the second watercraft, instructions to cause the second watercraft to move to the desired second position; and
      cause the second watercraft to move to the desired second position such that the first watercraft and the second watercraft comply with the desired relative positioning of the desired maneuver.

2. The system of claim 1, wherein the processor is located on the first watercraft.

3. The system of claim 1, wherein the processor is located on the second watercraft.

4. The system of claim 1, wherein the processor is located at a remote location.

5. The system of claim 1, wherein determining the first position of the second watercraft or determining the desired second position of the second watercraft comprises receiving marine data from one or more marine devices on the first watercraft and determining the desired second position of the second watercraft based on the received marine data.

6. The system of claim 5, wherein the marine data includes at least one of LIDAR data, data from vision systems, radar data, AIS data, sonar data, weather data, position sensor data, autopilot navigation system data, GPS data, predetermined threshold data, or vessel data.

7. The system of claim 1, wherein determining the instructions comprises receiving marine data and determining the instructions based on the received marine data.

8. The system of claim 7, wherein the marine data includes at least one of LIDAR data, data from vision systems, radar data, AIS data, sonar data, weather data, position sensor data, autopilot navigation system data, GPS data, predetermined threshold data, or vessel data.

9. The system of claim 1, wherein causing the second watercraft to move to the desired second position comprises causing at least one of a speed or a direction of the second watercraft to be altered such that the first watercraft and the second watercraft comply with the desired relative positioning of the desired maneuver.

10. The system of claim 1, wherein causing the second watercraft to move to the desired second position comprises sending a signal to the second watercraft that instructs the second watercraft to alter at least one of a speed or a direction of the second watercraft such that the first watercraft and the second watercraft comply with the desired relative positioning of the desired maneuver.

11. The system of claim 1, wherein the processor is configured to receive user input indicating the desired maneuver.

12. The system of claim 11, wherein the user input is received from a marine electronic device.

13. The system of claim 1, wherein the desired maneuver corresponds to causing the first watercraft and the second watercraft to travel over a desired search area of water.

14. The system of claim 1, wherein the processor is integrated into an autopilot navigation system that is associated with at least one of the first watercraft or the second watercraft.

15. The system of claim 1, wherein the desired second position of the second watercraft and the instructions are configured to cause the first watercraft to move such that the first watercraft follows the second watercraft in a following position that is offset from a path of the second watercraft.

16. The system of claim 1, wherein the desired second position of the second watercraft and the instructions are configured to cause the first watercraft to move such that the first watercraft follows the second watercraft in a way that dynamically changes in response to periodically received marine data.

17. A method for managing a position of a first watercraft relative to a second watercraft during a desired maneuver, the method comprising:
   determining a desired maneuver including a desired relative positioning of the first watercraft to the second watercraft;
   determining a first position of the first watercraft;
   determining a first position of the second watercraft;
   determining, based on the desired maneuver, a desired second position of the second watercraft such that the first watercraft and the second watercraft comply with the desired relative positioning when the second watercraft is in the desired second position;
   determining, based on the desired second position of the second watercraft, instructions to cause the second watercraft to move to the desired second position; and
   causing the second watercraft to move to the desired second position such that the first watercraft and the second watercraft comply with the desired relative positioning of the desired maneuver.

18. The method of claim 17, wherein causing the second watercraft to move to the desired second position comprises causing at least one of a speed or a direction of the second watercraft to be altered such that the first watercraft and the second watercraft comply with the desired relative positioning of the desired maneuver.

19. The method of claim 17, wherein causing the second watercraft to move to the desired second position comprises sending a signal to the second watercraft that instructs the second watercraft to alter at least one of a speed or a direction of the second watercraft such that the first watercraft and the second watercraft comply with the desired relative positioning of the desired maneuver.

20. A non-transitory computer readable medium having stored thereon computer instructions that, when executed by a processor, cause the processor to:
- determine a desired maneuver including a desired relative positioning of a first watercraft to a second watercraft;
- determine a first position of the first watercraft;
- determine a first position of the second watercraft;
- determine, based on the desired maneuver, a desired second position of the second watercraft such that the first watercraft and the second watercraft comply with the desired relative positioning when the second watercraft is in the desired second position;
- determine, based on the desired second position of the second watercraft, instructions to cause the second watercraft to move to the desired second position; and
- cause the second watercraft to move to the desired second position such that the first watercraft and the second watercraft comply with the desired relative positioning of the desired maneuver.

\* \* \* \* \*